(12) United States Patent
MacFarlane et al.

(10) Patent No.: US 12,254,345 B2
(45) Date of Patent: *Mar. 18, 2025

(54) TRANSITION MANAGER SYSTEM

(71) Applicant: Transitional Data Services, Inc., Westborough, MA (US)

(72) Inventors: Craig MacFarlane, Westborough, MA (US); Allison Layona Martin, Leicester, MA (US)

(73) Assignee: Transitional Data Services, Inc., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,284

(22) Filed: Oct. 6, 2023

(65) Prior Publication Data

US 2024/0045712 A1 Feb. 8, 2024

Related U.S. Application Data

(63) Continuation of application No. 17/728,512, filed on Apr. 25, 2022, now Pat. No. 11,816,499.

(60) Provisional application No. 63/179,073, filed on Apr. 23, 2021.

(51) Int. Cl.
*G06F 9/48* (2006.01)
*G06F 11/36* (2006.01)
*G06F 11/3604* (2025.01)

(52) U.S. Cl.
CPC ........ *G06F 9/4856* (2013.01); *G06F 11/3612* (2013.01)

(58) Field of Classification Search
CPC ............................ G06F 9/4856; G06F 11/3612
See application file for complete search history.

(56) References Cited

U.S. PATENT DOCUMENTS

| | | | |
|---|---|---|---|
| 8,789,022 B2 * | 7/2014 | Neogi | G06F 11/3668 717/124 |
| 9,841,991 B2 * | 12/2017 | Sizemore | G06F 9/5077 |
| 10,282,225 B2 * | 5/2019 | Vincent | G06F 9/45558 |
| 2010/0332820 A1 | 12/2010 | Matsushima et al. | |
| 2012/0151476 A1 | 6/2012 | Vincent | |
| 2012/0185856 A1 | 7/2012 | Ashihara et al. | |

(Continued)

OTHER PUBLICATIONS

International Preliminary Report on Patentability (Oct. 24, 2023).
(Continued)

*Primary Examiner* — S. Sough
*Assistant Examiner* — Zheng Wei
(74) *Attorney, Agent, or Firm* — Nixon & Vanderhye P.C.

(57) ABSTRACT

Systems, software, and methods for evaluating the scope of computer system changes related to automatic migration from one set of computing hardware to another provide methods and techniques that include evaluations for compliance with one or more policies prior to implementation, and then sequence and automate the migration tasks. A domain-specific language describes activity specifications and asset metadata, which is then used to generate interdependent activities in a project workstream on the basis of stored expert knowledge embedded in knowledge templates. Disaster recovery and "what-if" migration scenarios are tested in order to test and compare options of one or more proposed infrastructure changes.

15 Claims, 9 Drawing Sheets

(56) References Cited

U.S. PATENT DOCUMENTS

| | | |
|---|---|---|
| 2014/0208049 A1 | 7/2014 | Furusawa et al. |
| 2015/0020059 A1 | 1/2015 | Davis |
| 2015/0261842 A1 | 9/2015 | Huang et al. |
| 2016/0139852 A1 | 5/2016 | Huang et al. |
| 2018/0074748 A1 | 3/2018 | Maikin et al. |
| 2020/0089524 A1 | 3/2020 | Nelson et al. |
| 2020/0264919 A1 | 8/2020 | Vukovic et al. |
| 2022/0086241 A1 | 3/2022 | Sharma et al. |
| 2022/0091874 A1 | 3/2022 | Janikiram et al. |

OTHER PUBLICATIONS

International Search Report and Written Opinion Jul. 7, 2022.
Alsop et al., "Migration Use Cases with the Migration Manager Version 7.5", published by IBM, pp. 1-470 (Year: 2013).
Hwang et al., "Automation and orchestration framework for large-scale enterprise cloud migration", published by IBM Journal of Research and Development, 2016, pp. 1-12 (Year: 2016).

\* cited by examiner

TRANSITION MANAGER SYSTEM

1 CROSS REFERENCE TO RELATED U.S. PATENT APPLICATIONS

The present application claims priority under 35 U.S.C. § 119(e) to provisional U.S. Patent Application No. 63/179,073 filed Apr. 23, 2021, which is incorporated herein by reference in its entirety and for all purposes.

2 COPYRIGHT NOTICE

A portion of the disclosure of this patent document may contain material that is subject to copyright protection. The copyright owner has no Objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2021-2022, Transitional Data Services, Inc.

2.1 FELD OF THE TECHNOLOGY

The technology herein relates to computing systems and more particularly to moving machine-based functions between different and sometimes incompatible hardware computing platforms. The technology herein further relates to verification/testing of modified computing platforms to ensure reliability and safe, secure functionality.

3 BACKGROUND OF THE TECHNOLOGY

3.1 Related Art

We are constantly improving and upgrading our essential computing platforms. New hardware is generally faster, more cost effective, more energy efficient, more compact, and more capable. The computing machine you are using to access this patent is probably no more than a few years old the equipment you previously used in all likelihood worked fine but was made obsolete by newer, better technology. See Ford, "Technological obsolescence: Insights from the PC industry" (2010).

When upgrading to new computing hardware and systems, most users want to continue to use the same applications on their new computing machine that they used on their previous computing machine. The transfer of functionality from one computing platform to another is referred to as "migration." Just as birds migrate south for the winter, your applications can migrate from one computing platform to another.

But there can be problems and challenges involved in migrating applications between computing platforms, particularly as the applications and computing platforms become more complex and have an ever increasing number of dependencies on other applications and computing platforms. For example, newer computing platforms may have increased functionality but may not be entirely backwards compatible with one or a cluster of applications supported on older computing platforms. Furthermore, there might be eccentricities and customizations on the source computing platform that are not present on the target computing platform that cause migrated applications to "break" when transferred to the target computing platform. The breakage may be latent in the sense that the migrated application appears to run just fine on the target computing platform but then crashes when it accesses an exception or unusual condition or aspect of its functionality.

In addition, there are problems and challenges with migrating data formats and structures that these programs operate upon. Just as common word processing programs evolve their file formats from version to version, database and other information storage schemes also evolve from version to version, and the data formats and data representations may not be fully backward compatible, requiring at least one data conversion to migrate legacy data into a new format during the migration. In a related challenge, data format migrations can often take many hours or days to perform, further complicating the migration in a 24/7 available environment.

Furthermore, migration often introduces new requirements and different integration of applications. For example, migrating an older legacy system may entail the new system functions for single sign-on and be subject to new security, data integrity, and business requirements such as service level agreements, all of which must be considered and accounted for as part of the migration process.

Failing to migrate computer systems and services with automated assurance is the source of many current day system outages and service failures. These outages often take hours or days to identify and correct, and can result in significant lost revenue and/or customer dissatisfaction, as well as corrupted data and the failure of previously integrated applications to interoperate correctly. In some contexts where safe, secure software functionality is extremely important (e.g., air traffic control, medical systems, real time control, power grid control, etc.), the outages can be disastrous.

Many information technology migration, deployment, and monitoring tools have traditionally been siloed, in that they do not inter-operate nor do they share information, generally requiring re-entry of information and significant duplication of effort. For example, migration tools such as VMWare's vMotion and Platespin's Migrate, move a system configuration from one computing platform to another and migrate the computing resources between the physical and virtual environments. vMotion moves entire virtual environments as a unit, while Migrate moves configurations from a first system to a second system (often virtual). They do not provide for refactoring of services to differing platforms, nor do they provide assurance or monitoring in order to ensure the migration conforms to requirements (including data separation and operational requirements), or that the moved system is operating in conformance with its operational requirements. Similarly, deployment tools such as Puppet and Chef install software and configurations to a target computing system, but again do not provide assurance or monitoring that ensure the deployment meets operational requirements, nor do they manage the migration of the operational load from an existing set of computing resources to the newly deployed resources in accordance with defined operational requirements.

In addition, in many such systems, each of the process steps are discrete and do not provide start-to-finish management and monitoring of a plurality of migrations that are often required to completely move larger deployed systems to new/different implementations. In addition, they do not manage the migration of the data from the source platform to the target computing system(s), which results in further unmanaged operational disruption beyond the migration of the operating software and configurations to a new computing platform.

In addition, many current migration and migration management systems are siloed, which prevent their interoperation, sharing of information, and the recognition of effects of a change in a first system or migration tool adversely affecting the operation of a second system or migration tool. Many such tools share one or more of the following attributes, which can cause problems for automated migrations:

- No coordination to assure migration steps are executed in the proper sequence, forcing users to keep track of all activity dependencies in an external environment. A system that automatically identifies and manages migration step orders (in accordance with the expert knowledge of dependencies and requirements) and outcomes is needed.
- Each tool has a unique representation of data, unique user interfaces, unique procedures actions, and unique error handling/responses. This high degree of variability across the workstream is subject to human data entry errors and results in inconsistent outcomes. A centralized and standardized approach that integrates the various systems accounts for these tool variants and drives successful execution is needed.
- Existing systems have no visibility into hardware and software interdependencies, resulting in a current tool's completing a specific migration task successfully without visibility into what other software and infrastructure were adversely affected by the change, where these adverse effects reduce the overall system functionality and/or operational capability. Visibility and management of the overall system functionality is needed.
- Manually maintained processes to coordinate sequence of steps across silo tools are not updated when processes themselves or asset inventory changes, resulting in errors when they are subsequently used. Automated systems for coordinating and managing processes and process steps in light of changing architectures and processes are needed.
- Managing computing infrastructure on a silo basis does not take into account regulatory/governance impact which can be based on industry, information type, or internal policy (collectively compliance), Computing infrastructure management with respect to compliance requirements is needed.
- Monitoring systems such as ScienceLogic's EM7, HP OpenView, and the like provide for the collection and monitoring of hardware and software operational parameters, but are not designed specifically for managing and assuring migration of a first system architecture to a second systems architecture.

4 Summary of Example Technology

One example implementation includes a source computer system comprising at least one source processor connected to source storage and to a source communication interface, the source storage configured to store an executable application and associated data, the source computer system having at least one source characteristic; and a target computer system comprising at least one target processor connected to target storage and a target communication interface, the target computer system having at least one target characteristic. A migration computer system in communication with the source computer system and the target computer system via the source and target communication interfaces, respectively, the migration computer system comprising: at least one migration processor operating a transition manager application and storage operatively coupled to the at least one migration processor, and a migration communications interface operatively coupled to the processor, wherein the transition manager application is configured to use the migration communication interface to communicate with the source communication interface and a target communication interface, the migration processor being configured to perform migration operations comprising: identifying at least one type of transition to perform based upon the characteristic of the source computer system, selecting one or more transition templates based upon the identified type of transition, the characteristic of the source computer system, and the characteristic of the target computer system, converting the selected one or more transition templates to a sequence of ordered automated actions, executing the ordered actions to migrate functions from the source computer system to the target computer system to bind a resulting executable with one or more data elements represented by a data model, and automatically verifying that the target computer system with the migrated function is operational.

Exemplary, illustrative, technology herein relates to systems, software, and methods for evaluating the scope of computer system changes related to a migration from one set of computing hardware to another. This technology further relates to providing methods that include evaluations for compliance with one or more policies prior to implementation, and then helps sequence and automate the migration tasks. The technology further relates to using domain-specific language to describe activity specifications and asset metadata, which is then used to generate interdependent activities in a project workstream on the basis of stored expert knowledge embedded in knowledge templates. The technology can be further used to test disaster recovery and "what-if" migration scenarios in order to test and compare options of one or more proposed application, microservices, containers or infrastructure changes.

The technology herein has applications in the areas of system updates, task management, and project workstream development and automation.

In one aspect, a transition manager system comprises a processor operating a transition manager application, non-transitory storage operatively coupled to the processor, and a communications interface operatively coupled to the processor, wherein the transition manager application is configured to use the communication interface to communicate with a source computer system(s) and a target computer system(s), the processor being configured to perform operations comprising: identifying at least one type of transition to perform based upon a characteristic(s) of the source computer system(s), selecting one or more transition templates based upon the identified type of transition, a characteristic(s) of the source computer system, and a characteristics of the target computer system(s), converting the selected one or more transition templates to a transition workstream comprising ordered actions, executing the ordered actions to migrate aspects of the source computer system(s) to the target computer system(s), and after executing the ordered actions, verifying that the target computer system(s) is operational.

Another aspect relates to a method of operating a transition manager system, comprising a transition manager computer system further comprising at least one processor operating the transition manager application; non-transitory storage, and a communications interface, where the transition manager application is in communication using the communication interface to at least one source computer system and at least one target computer system, the processor implementing the steps of: identifying and characterizing aspects of one or more source computer system to be transitioned; storing the identified and characterized aspects as a data structure in a data store; identifying at least one transition to perform based upon characterized aspects of a source computer system; identifying one or more computer systems to be the target computer systems) of the transition; obtaining one or more transition templates, the transition templates selected based upon the type of transition identified, one or more identified source computer system, and at least one identified target computer system; associating the source computer systems and the target computer systems with the selected transition templates; converting the transition template(s) to a transition workstream; storing the completed transition workstream in a data store; executing the ordered actions of the transition workstream in order to migrate aspects of the source computer system(s) to the target computer system(s); and verifying that the transitioned computer systems are operational.

Example Requirements Association with Transition Template

A further aspect may include: identifying a transition template identifying one or more requirements specifications for the operation and/or configuration of at least one target computer system; associating the requirements specifications with the transition template, and storing the completed transition template in a data store.

A further aspect includes identifying and associating requirement specifications with at least one target computer system, further comprising the steps of: identifying one or more requirement specification elements applicable to a target computer system, and associating the identified specification elements to aspects of a target computer system, and identifying test (components), testing scenarios, and success/failure conditions in order to test aspects of the target computer system for compliance with the associated requirement specification elements and associating the identified components with the transition template.

Example Testing of the Resulting Target Computer System

In a further aspect, the verifying of the transitioned computer systems includes a ste of performing one or more tests on a target computer system to determine its operational state.

In a further aspect, the verifying of the transitioned computer systems includes a step of performing one or more tests associated with a requirement specification upon a target computer system to determine its operational state and whether the operational state is in conformance with the associated requirement specifications.

Example Verification of Transition/Verification of Specification

In a further aspect, ordering the actions of the transition workstream includes the step of identifying requirement elements related to the transition and operation of the source and target systems, and ordering the transition workstream actions so their execution does not leave the systems in transition unable to perform in accordance to at least one requirement specification element.

In a further aspect, the transition workstream has at least one action added to verify that one or more transition workstream action a) performs the migration of an aspect of the source computer system to a target computer system, and b) does not interrupt the operation of the transitioned system so that its operation does not perform in accordance to at least one requirement specification element.

In a further aspect, the action(s) added to the transition workstream are verification action(s) added after one or more migration actions, in order to determine the success of at least one migration action.

In a further aspect, the action(s) added to the transition workstream include at least one action to roll back (undo) the effect of a migration action in the event that a preceding verification action makes a failure determination.

In a further aspect, the actions(s) added to the transition workstream include at least one action to disable the aspects of the source system that were just migrated and verified.

Example Transition Template to Transition Workstream (e.g. Runbook Compilation)

In a further aspect, the conversion of a transition template to a transition workstream includes the steps of verification of the transition workstream.

In a further aspect, the conversion of a transition template to a transition workstream includes the steps of ordering the transition workstream.

In a further aspect, the conversion of a transition template to a transition workstream includes the steps of compiling the transition workstream.

In a further aspect, the compiling is performed before transition workstream execution.

In a further aspect, the compiling is performed "just in time" relative to the step execution.

Example Transition Workstream Verification

In a further aspect, the verification of the transition workstream includes the step of ensuring that all identified aspects of the source computer system are associated with one or more transition workstream actions.

In a further aspect, the verification of the transition workstream includes the step of verifying that each of the source computer system aspects are associated with at least one migration action and a target computer system.

In a further aspect, the verification of the transition workstream includes associating each migration action with one or more security credentials that permit access to the source and target computer system(s).

In a further aspect, the verification of the transition workstream includes associating each migration action with at least one specific user who can provide the security credentials to the source or target computer system(s).

In a further aspect, the verification of the transition workstream includes steps of measuring the operational characteristics of the target computer system(s) and confirming that the measured operational characteristics are in conformance with one or more requirement specification elements.

Example Transition Workstream Ordering

In a further aspect, the ordering of actions in the transition workstream is chosen based upon operational requirements of the source or target computer systems.

In a further aspect, the ordering of actions in the transition workstream is chosen based upon a requirement specification.

In a further aspect, the ordering of actions in the transition workstream is chosen based upon a service availability requirement specification.

Example Lifecycle Analysis

In a further aspect, the steps further comprise one or more step(s) to simulate the performance of a target system providing the migrated services associated with it.

In a further aspect, the simulation steps include a verification of simulated performance against one or more requirement specifications.

In a further aspect, the requirement specifications identify one or more of requirements selected from the set of (target system resiliency, security compliance, data separation compliance, target system availability).

In a further aspect, the identification of a transition workstream and/or a transition template is based in part upon results of the simulated performance.

Example Migration Actions

In a further aspect, the migration actions include the use of one or more expert system embodiments as software migration components for the migration of an identified aspect of the source system.

In a further aspect, the migration actions include the use of one or more templated scripts for the migration of an identified aspect of the source system.

In a further aspect, the migration actions include an action to remove an aspect of a source computer system from use.

In a further aspect, the migration actions include an action to install a new instance of an application on a target computer system.

In a further aspect, the migration actions include at least one action to migrate data from a source system to one or more target computer system(s).

In a further aspect, the migration actions include a plurality of actions to migrate the data in two or more tranches.

In a further aspect, the migration actions include a plurality of actions to migrate the data on a periodic or recurring basis.

In a further aspect, the migration actions include the use of one or more software applications present on the source and/or target computer systems.

In a further aspect, the migration actions include at least one action for migrating data and changing its organization and/or structure as part of the migration.

In a further aspect, the migration actions include at least one action for the migration of data including a deduplication process, a data de-conflicting process or some other process.

Further aspects provide integration with/orchestration of refactoring platforms or application development PaaS (Platform as a Service) platforms in the cloud.

Further aspects provide an ability to make transition recommendations based on asset metadata, e.g. data analysis scripts (rules engine) to recommend rehost to X, Y, Z vs. replatform vs. retire.

These and other aspects and advantages will become apparent when the Description below is read in conjunction with the accompanying Drawings.

5 BRIEF DESCRIPTION OF THE DRAWINGS

The features of the present technology will best be understood from a detailed description of the technology and example embodiments thereof selected for the purposes of illustration and shown in the accompanying drawings in which.

Figure 1:
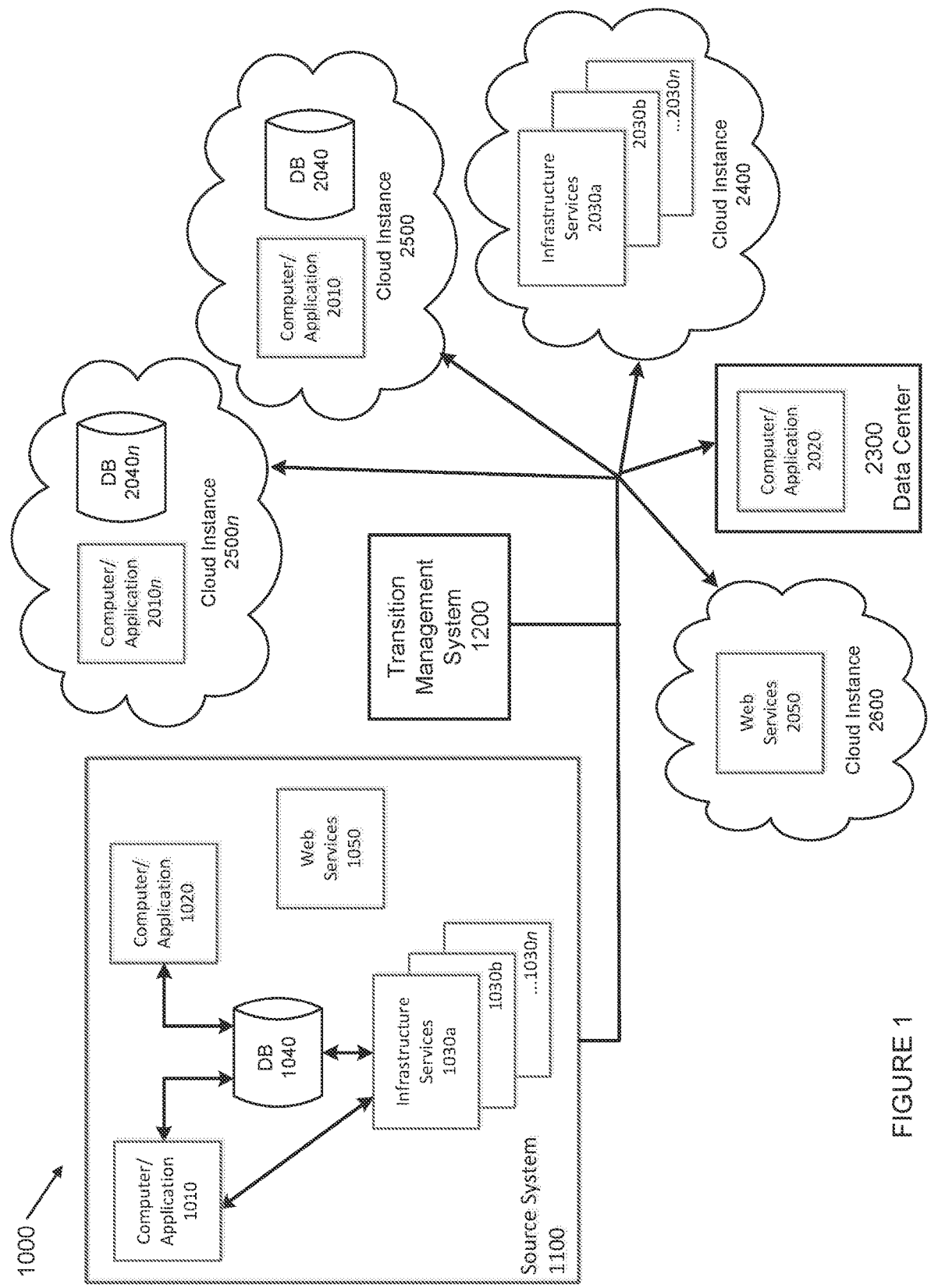
FIG. 1 depicts an exemplary non-limiting system embodiment.

6 DESCRIPTION OF SOME NON-LIMITING EMBODIMENTS OF THE TECHNOLOGY 6.1 Summary

During large IT migrations from one implementation platform to another (such as from an inhouse server collection to a cloud-based implementation), service continuity is often placed at-risk as dependencies, governance, security, and system resilience controls are often incompletely considered. Some of this is due to a lack of tracking flexibility and visibility of change impacts.

The described system provides computer system transition analysis and management, where transitions involve the migration (and potential upgrades) of one or more technical aspects of a computer hardware and software application deployment, and any required supporting infrastructure, in whole or in part, where the transition includes the activity performed to prepare, then manage (and in some cases, perform) the implementation for converting technical aspects from one or more defined aspects of a first deployment and operating model to one or more defined aspects of a second deployment and operating model. Unlike some prior art systems migrations techniques as provided using their respective tools, transitions are prepared, managed, and performance assured operations that operate to maintain one or more defined operational characteristic(s) of at least one defined computer system(s) (and/or computer system architecture(s)) during the process of performing the technical changes required to accomplish the migration(s) and to provide assurance that the resulting computer system(s) (or computer system architecture(s)) provide the required aspects and operational characteristics at the end of the migration process.

Unlike some current siloed infrastructure approaches and the tools that support them (e.g. rehost, replatform, replace, and refactor tools), transition processes are complex in that they manage the ongoing provision of user-facing services during various aspects of the transition process. Many current systems do not address the integration of the business requirements (both current and prospective), including preparing, implementing, and verifying the success of the transitions, nor do they address ongoing availability requirements throughout the process and in the final state.

An example non-limiting embodiment of a Transition Management System (TMS) provides an automated method for identifying computing requirements and components currently implementing those requirements, determining the actions required to manage the migration of each of these computing components, and managing the migration of a deployed computer system architecture from a starting (source) deployment architecture comprising a plurality of computer systems and servers to one or more target deployment architecture(s) using the following process:

assessing the starting deployment architecture to discover the components, current performance characteristics, and operational requirements present in the source deployment architecture, determining the relationship between the components and the initial component configurations of the source deployment architecture, constructing a virtual model of the source deployment architecture, selecting a target deployment architecture, including new/changed performance and/or operational requirements, selecting and populating one or more transition templates using the virtual model to create one or more runbooks, executing each runbook activity (also called a migration activity or a migration step) implementing the migration of one or more components of the source deployment architecture to components of the target deployment architecture, and assuring the successful migration of the components for each activity in accordance with specified requirements, and assuring end-to-end performance of the resulting target deployment architecture with respect to the defined performance and operational requirements.

These and other aspects and advantages will become apparent when the Description below is read in conjunction with the accompanying Drawings.

6.2 Definitions

The following definitions are used throughout, unless specifically indicated otherwise:

| TERM | DEFINITION |
|---|---|
| Source deployment architecture | Starting (currently deployed) computer system architecture comprising a plurality of computer systems, servers, and software applications including but not limited to cloud native applications such as containers, services, etc. |
| Target deployment architecture | Proposed computer system architecture for future deployment comprising a plurality of computer systems, servers, and software applications. |
| Assurance | Process by which the configuration and/or operation of a computing component (or set of computing components) is compared against one or more requirements. |
| Assurance, operational | Operational assurance is assurance that one or more computer components are operating within the defined requirement parameters. |
| Migration | Movement of services and relationships from a first computing resource to a second computing resource. Can be used once (e.g., migrate to cloud) or recurring (failover/fallback, ad-hoc "migrations" required for upgrades, management change, incident resolution, etc.) |

-continued

| TERM | DEFINITION |
|---|---|
| Runbook | Definitions for the migration from a deployed computer system to a proposed or identified computer system deployment that enumerates the actions required to migrate the deployed computer system (or service) from the current (source) deployed configuration to the proposed or identified (target) configuration. |
| Runbook portion | The part of a runbook that defines the migration and assurance of a specific (set of) computing resources. |
| Runbook instance | A specific instance of a runbook that has been partially or completely parameterized. |
| Runbook template | An abstracted model describing the process to migrate a system or service from one state to another. When applied to a specific set of systems and services, an environment-specific runbook instance is generated. |
| Runbook, parameterized | A definition of an existing or proposed computer system or service integrated with one or more transition template(s) which describe the existing and/or proposed computer system or service. |
| Runbook, active | A parameterized runbook that is fully populated and is in the process of being used to manage a system transition. |
| Runbook agent | A software program that automates a part of the migration of a service from a source computer system to a target computer system. For example, a runbook agent may be a piece of software for the sole purpose and functionality of migrating the configuration of a source DNS server to a target DNS server. Legacy deployment and migration tools may be used as runbook agents to automatically implement migrations of a runbook activity. |
| Template | A data structure encoding one or more aspects or characteristics of a computer system, computer application, or requirement. |

6.3 Exemplary Non-Limiting System Architecture

FIG. 1 depicts an exemplary system 1000. Source system (1100) comprises computer(s)/application(s) (1010, 1020), an internal database (1040), infrastructure services (1030a . . . 1030n), and web services (1050). Transition management system (TMS) (1200) operates to identify and characterize aspects and components of the source computer system(s) (1100), identifies the necessary migrations and assurances required to transition one or more of the identified aspects and components to new target computing system locations, and then performs and manages the migration of each of the identified aspects and components of the source system (1100) to one or more target systems (2300, 2400, 2500 . . . 2500n, 2600) while maintaining the defined deployed relationships and functionality. Lastly, the transition management system tests the transitioned components for proper operation and functionality in accordance with one or more predefined specifications.

In the exemplary system illustrated in FIG. 1, the TMS supports the following exemplary types of transitions:

Web services (1050) is transitioned to web services (2050) and migrated to cloud instance (2600).

Computer/application (1020) is transitioned to computer/application (2020) and migrated to an external data center (2300).

Infrastructure service components (1030 . . . 1030n) are transitioned to infrastructure service components (2030a . . . 2030n)) and migrated to one or more external providers cloud instance (2400), including the migration of any data related to the infrastructure service components. Examples of infrastructure services include identity provider services, DNS, and the like.

Computer/application (1010) and its corresponding database (1040) are transitioned and migrated to one or more cloud instances (2500, 2500*n*) as computer/application (2010, 2010*n*) and database (2040, 2040*n*).

Figure 1A:
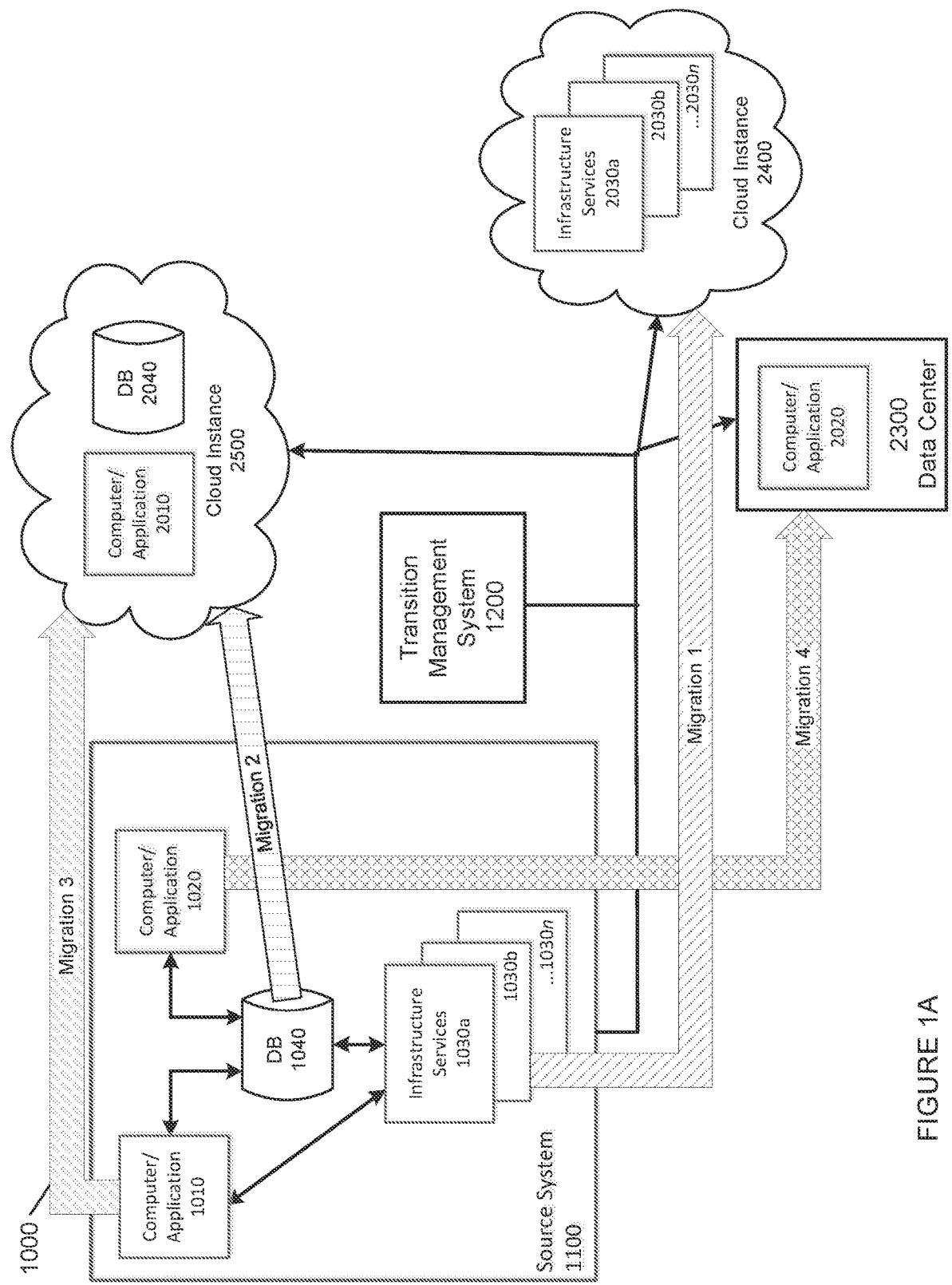
FIG. 1A illustrates an example of the complex migrations required to migrate one or more functions of a source computer system (1100) to any of several different types of target computer systems.

FIG. 1A illustrates an example of the complex migrations required to migrate one or more computing functions of a source computer system 1100 to any of several different types of target computer systems. In this example, four dependent subsidiary migrations are performed as part of the migration with assurance processes defined in a runbook and performed under the control of the TMS. Each of the computing functions of the source computer system has one or more characteristics that distinguish it. Characteristics may include public interfaces (e.g. web or network), services provided, software application versions, etc. The migration dependencies are established to ensure that the data and programs are moved in an order that permits them to continue functioning. Not shown for clarity are transition manager managed changes to firewalls, external services such as DNS. IP registries, as well as the transition manager control network connections to the computer systems and cloud instance service providers.

A first migration occurs when the one or more infrastructure services (1030*a*, 1030*n*) on source computer system 1100 are migrated to one or more target instances provided as part of an externally hosted internet cloud service, such as those instances provided by cloud service providers such as Amazon AWS, Microsoft Azure, and others. During this first migration, the computer programs and data used to provide each infrastructure service may be moved (copied), installed anew in the cloud instance 2400, or ported from the source instance format to the target instance format. In some cases, when the computer program to be migrated is already present in the cloud instance, only the data is moved. As is well understood, each cloud instance computer may be one or more virtual computer(s) and/or one or more actual physical computers without deviating from the teachings of this disclosure. The transition management system (1200) may communicate directly with an existing cloud instance or may cause the cloud service provider to create a new cloud instance to support the migration (e.g. provisioning a new instance). The functioning of each migrated infrastructure service then verified by the transition management system (or in accordance with direction of the transition management system) in order to provide assurance that the migration of each infrastructure service was successful and that the new instance provides an acceptable level of service. In some implementations, the dependency between computer application 1010 and the infrastructure services is updated as part of migration 1, and the operation of computer application 1010 is also verified for assurance purposes. In some implementations, the TMS may cause external systems, such as configuration management systems (e.g. Puppet), to install the desired software configurations on a target computer system.

Continuing with the example, the computer database (DB 1040) is then migrated (arrow labeled Migration 2 from the source system 1100 to a second target cloud instance 2500. Cloud instance 2500 may be provided by the same or different cloud instance and/or cloud service provider as used to for Migration 1, and the provisioning, is managed by the transition management system in the same manner the infrastructure services migration. Once the database programs are established, any required data in the DB 1040 is migrated to DB 2040, and the functioning of the migrated database then verified by the transition management system (or in accordance with direction of the transition management system) in order to provide assurance that the migration of the database was successful and that the new instance provides an acceptable level of service. In some implementations, the dependency between computer application 1010, computer application 1020, and the already migrated infrastructure services (2030*a*, . . . , 2030*n*) is updated as part of Migration 2, and the operation of computer applications 1010 and 1020 is also verified for assurance purposes.

After completion of Migration 2, the transition management system then manages the transition labelled Migration 3. Migration 3 causes computer application 1010 (its software, configuration data, and network configuration) of the source computer 1100 to be migrated to the second cloud instance 2500 in the same manner of the previous two migrations. The configuration of computer application 1010 may be changed during the migration in order to maintain the connectivity of migrated application 2010 to the previously migrated infrastructure services and the previously migrated database. As in other migrations, the operation of the now migrated computer application 2010 is then verified for assurance purposes.

After completion of Migration 3, the transition management system then manages the transition labelled Migration 4. Migration 4 causes computer application 1020 (its software, configuration data, and network configuration) of the source computer 1100 to be migrated to a stand-alone computer in data center 2300 in the same manner of the previous two migrations. The configuration of computer application 1010 may be changed during the migration in order to maintain the connectivity of migrated application 2020 to the previously migrated infrastructure services and the previously migrated database. As in other migrations, the operation of the now migrated computer application 2020 is then verified for assurance purposes.

At the end of the migration, the target computing system(s) now have the migration specified target characteristics created by the migration of the applications and services from the target computing systems.

This series of migrations illustrates an example transition manager process for migrating a complex computer system comprising a plurality of computer programs and services to different hardware and technologies.

Figure 1B:
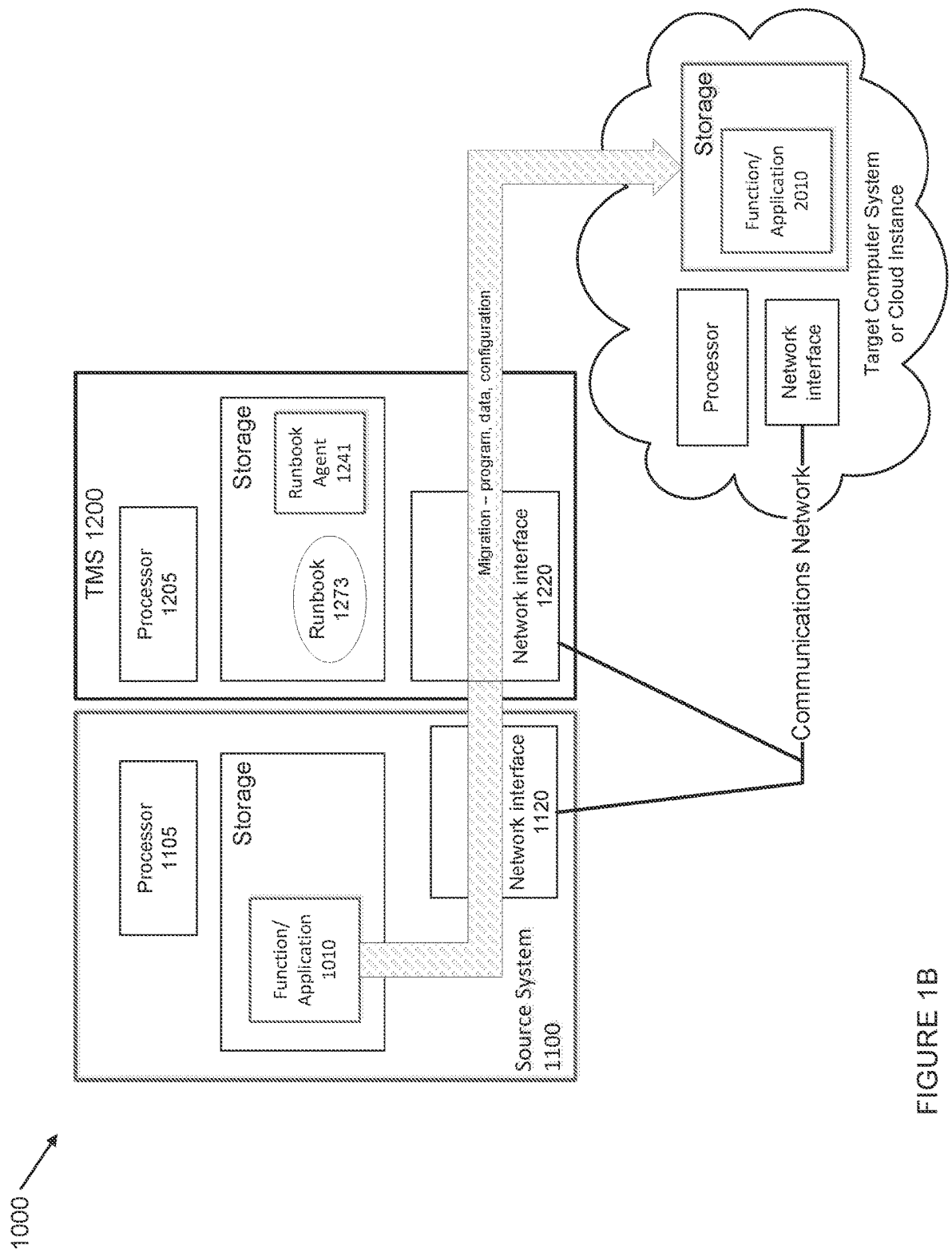
FIG. 1B illustrates an example of a TMS 1200 system managing the migration of an application, service, or other function provided by source system 1100 (as previously depicted in FIGS. 1 and 1A).

FIG. 1B is a more detailed example of a TMS 1200 system managing the migration of an application, service, or other function provided by source system 1100, as previously depicted in FIGS. 1 and 1A. The TMS's processor (1205), running a discovery program, connects to the source system over a network and causes the source system's processor (1105) to read the configuration and data of the function/application 1010 (optionally, DB 1040, or infrastructure services 1030, as depicted in FIG. 1) using one or more discovery agent program(s)(FIG. 2, 1243 or a local copy of an agent (not shown)). The resulting configuration and dependency information is transmitted over a network (via the network interface 1120) to the TMS, and is used to populate a migration template (not shown) stored in a persistent storage (1260 or 1270) of TMS 1200. Alternatively, one or more of the aspects of the migration template are manually populated by an operator of the TMS. The migration template is also further populated with information from other sources, as described below. The completed template is combined into a runbook (1273), and used to control the migration process. Once a migration is started by the TMS, the processor (1205) of the DAS takes the steps specified in the runbook as described herein to cause the function/application present on the source system to be migrated to the target computer system over a shared computer network. Unlike simple workflow management systems, the TMS implements detailed and specialized knowledge of how to install, configure, and test applications/services by combining workflow with specialized knowledge management (and expert systems) that manage programs, data; communications, and other aspects of computing systems.

The TMS identifies and manages the installation of any required programs on the target computer system using application installers, and then addresses the migration of the application configuration. The IMS then proceeds by extracting configuration information (and determining the dependency information from the configuration information) from the source system, transforms it (on the TMS) into a format required by the target computer system (and stores it in a form usable by the migration template), and then moves the transformed configuration data to the target computer system, using its detailed and specialized knowledge of configuration formats (and automation programs that read, manage, and write configuration formats) to install the modified configuration information on the target computer system. In some implementations, the installation configures a previously unconfigured application or service. In other implementations, the transformed configuration data is merged into an existing configuration on the target computer system. Note that this part of the process permits the migration to be "rolled back" or repeated for disaster recovery purposes.

In a next step, if there is any additional data that must be migrated (as defined by the migration template), the TMS then extracts any stored data from the source system, transforms it as required, and installs the data into the target computer system, causing the target computer system to then be able to perform the function/application that was originally provided by the source system. The TMS extraction/transforming/storing step may be repeated several times until all of the data stored on the source system is migrated. Lastly, the TMS uses its detailed and specialized information about programs, configurations, and data, as well as defined testing information to test the now migrated application for assurance purposes. The detailed tests to be performed are specified within the migration template.

Figure 2:
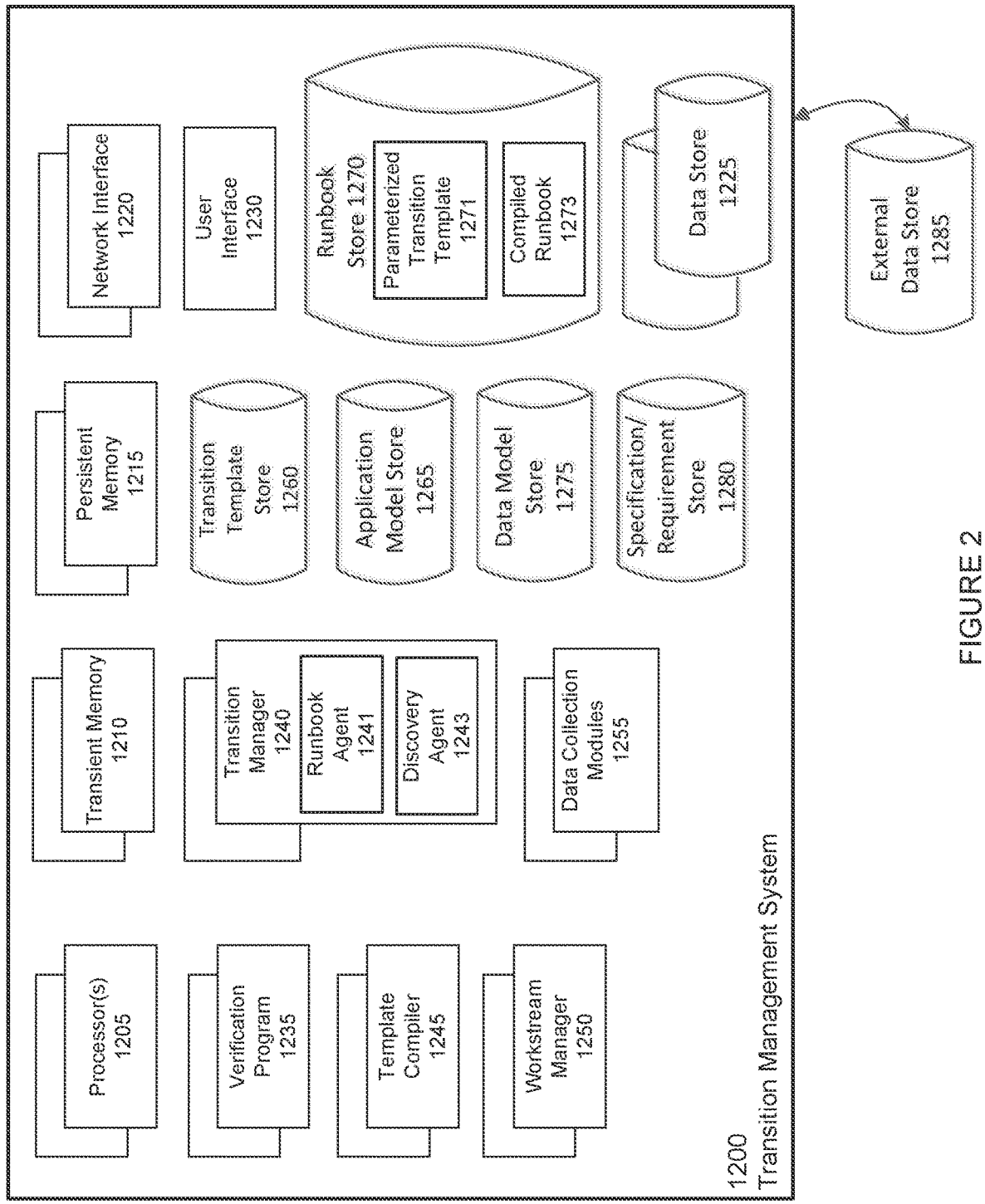
FIG. 2 depicts an exemplary embodiment of a Transition Management System.

As illustrated in FIG. 2, the transition management system (1200) comprises one or more processors or data processing components (e.g. 1205), such as general purpose CPU type or specialty processors such as FPGA or GPU, operably connected to memories of both persistent (1215) and/or transient (1210) nature that are used to store information being processed by the system and to additionally store various program instructions (collectively referred to herein as "programs") (e.g. 1235-1255) that are loaded and executed by the processor(s) (1205) in order to perform the process operations described herein. Programs are described in more detail below. In some cases, such as FPGAs, programs comprise configuration information used to adapt the processor(s) for particular purposes. Each of the processor(s) is further operably connected to networking and communications interfaces (1220) appropriate to the deployed configuration. The interfaces are in turn, operably connected to an appropriate communications network as determined by the system configuration in order to allow communications between the TMS and other systems operably connected to the network. Stored within persistent memories of the system are one or more databases (1225) used for the storage of information collected and/or calculated by the servers and read, processed, and written by the processor(s) (1205) under control of the program(s) (1235-1255). The transition management system (1200) may also be operably connected to an external database (1285) via one or more network or other interfaces without departing from the scope of the disclosure.

Persistent non-transitory memories include disk, PROM, EEPROM, flash storage, and similar technologies characterized by their ability to retain their contents between on/off power cycling of the system. Some persistent memories take the form of a file system for the server and are used to store control and operating programs and information that defines the manner in which the server operates, including scheduling of background and foreground processes, as well as periodically performed processes. Persistent memories in the form of network attached storage (NAS) (storage that is accessible over a network interface (1220) also are used without departing from the scope of the disclosure. Transient memories include Random Access Memory (RAM) and similar technologies characterized by the contents of the storage not being retained between onloff power cycling of the system.

One or more databases include local file storage, where the file system comprises the data storage and indexing scheme, a relational database (such as those produced commercially by the Oracle Corporation, or My SQL), an object database, an object relational database, a NOSQL database (such as the commercially provided MongoDB), or other database structures such as indexed record structures. The databases are stored solely within a single persistent memory, or are stored across one or more persistent memories, or are stored in persistent memories on different computers.

The transition management system (1200) further comprises:
  one or more application models, each of which is implemented as a data structure stored in one or more of the system data stores (1265), as described below,
  one or more data models, each of which is a data structure stored in one or more of the system data stores (1275), as described below,
  one or more business/operational requirement specifications, each of which are stored as a data structure in one or more system data stores (1280), and include requirement specifications selected from performance requirements, availability requirements, security requirements, data isolation requirements, data management requirements, and other requirement specifications. The requirement specifications are associated with one or more verification programs (1235) that verify one or more aspects of a system configuration and/or operation vs. the requirements specification,
  one or more data collection modules (1255) that discover aspects of deployed systems [both before (source system(s)) and after transition (target system(s)],
  one or more transition templates (sometimes called migration templates for migration process specific templates), each of which is implemented as a data structure stored in one or more of the system data type specific data stores (e.g. 1260 or 1270), and which define the processes and workflows required to transition one aspect of a computing system, application, or data into another computing system, application, or data,
  one or more runbooks (1273), which are compiled instances of a set of one or more transition templates that are associated with and define a system transition, and are stored in one or more of the system data stores (1270), one or more general data stores (1225), typically comprising one or more databases utilizing a database manager software. The general data stores may implement one or more of the data type specific data stores.

one more template compilers (1245), which convert incomplete transition templates into compiled runbooks, one or more workstream manager components (1250), one or more transition manager components (1240), which executes compiled transition templates, one or more verification programs (1235), which verify the installations and/or operation of a system component or assembly, and a user interface (1230) for manual entry of information and interaction with one or more users of the transition management system.

The TMS further comprises one or more persistent storage areas for transition templates, parameterized runbooks, active runbooks, policies, configuration data, and virtual models. This can include a store/storage area for automation packages and for data scripts (rules). The persistent storage for these components is logically referred to as "stores," as shown below in Table 1. Stores are described as logically separated and are deployed in various configurations. The described stores are preferably constructed using standard database systems such as those described above. Other forms of persistent storage, such as local disk storage and/or network attached disk storage also are used.

TABLE 1

| # | Data Store Name | Function | Functional Reference |
|---|---|---|---|
| 1225a | Runbook template store | Storage of standard and custom templates for constructing runbooks. | FIG. 2 (as part of 1225) |
| 1225b | Parameterized runbook(s) store | Storage of runbooks containing parameter information for source and target deployment architectures. | FIG. 2 (as part of 1225) |
| 1225c | Active runbook(s) store | Storage of state/status information for parameterized runbooks currently in use during the migration process. | FIG. 2 (as part of 1225) |
| 1225d | Configuration data store | Storage of component and configuration/relationship information for source and target deployment architectures. | FIG. 2 (as part of 1225) |
| 1225e | Virtual model data store | Storage of virtual model information for the source deployment architecture. | FIG. 2 (as part of 1225) |
| 1225f | Policy data store | Storage of policy information, including definitions for deployment, configuration, data segregation, security, and the similar policies. | FIG. 2 (as part of 1225) |
| 1225g | Target deployment data store | Storage of target deployment architecture configuration and related policies. | FIG. 2 (as part of 1225) |

The TMS is illustrated with multiple logical databases for clarity. The TMS is deployed using one or more physical databases implemented on one or more servers or alternatively is implemented using clustering techniques so that parts of the data stored in the database is physically stored on two or more servers. In some implementations, the system database or one or more of the logical databases is implemented on a remote device and accessed over a communications network.

6.3.1 Application Models

The transition management system further comprises a set of one or more application models, which are data structures that define aspects of well-known applications and system components. They encode expert knowledge of the application and system component requirements, features, and parameterization options. Each application model is a data structure that is stored in one or more databases of the system. The application models are used by the system to identify aspects of discovered applications and computer/networking architectures, including configuration, current utilization, performance, as well as externally, provided attributes (e.g. attributes from external systems, stakeholders, and SMEs) that must be accounted for during migrations and modernizations. Each of the identified aspects is associated with one or more additional data models which identify the data required for each aspect, one or more data collection modules that collect information about specific aspects as identified by at least one data model, and one or more optional transition templates.

For example, an application model for an Oracle database defines (describes) the database software and application(s) components of that software, and defines multiple possible deployment architectures for the database, such as local and remote data storage, typical performance metrics, etc., as aspects of the database description. Each aspect is associated with one or more identified configuration variables and/or other application models, and is further associated with one or more data models that describe the functionality and/or configuration of the database. Additionally, each of the aspects is associated with one or more data collection modules (1255) that are executed (manually or automated) to collect information about a discovered aspect.

In a second example, multiple application models are nested or associated to more fully describe all of the aspects of the system. Thus, the system level application model comprises an application model for an Oracle database, and an application model for a computer server system connected to network attached storage over a network and/or other connections of a distributed computing system.

An exemplary model for an application (in this case, an Oracle database) is an encoding that defines the following parameters:

the name of the database and its version ID (and any directly compatible version IDs), the location of configuration files and their contents and fields that should be customized, its processes and their tuning parameters, the Oracle applications disk requirements and performance requirements, both static and transactional, system tuning parameters required for optimizing the operation of the database, and the install automation (runbook agent) or activity definition that will perform an install of the application to a specified system.

Application models are stored in the application model store (1265) of the TMS.

In a third example, multiple applications models are nested or associated to more fully describe aspects of inter-related applications. In this example, the system level application model comprises a "distributed" application (or application family), such as a global SAP installation, with subsidiary application instances as distributed throughout the world. An upgrade to the SAP application and/or its supporting infrastructure (e.g. supporting Oracle database) requires a managed transition to assure continuous availability, application interoperability, and data integrity during the entire transition process. The global SAP installation is defined in a first model, with subsidiary models for each instance of the application, e.g. a first subsidiary application model for SAP-Germany, and a second subsidiary application model for SAP-UK. Each model further references its dependencies, e.g. a local Oracle database instance in its own subsidiary model. The individual Oracle database models can be rolled up through the SAP subsidiary models, or can be independently rolled up through a global Oracle model associated with the global SAP model.

6.3:2 Data Models

The system comprises one or more data models, which are data structures that define data about discovered application and computing systems instances represented by one or more application models. A data model describes the information to be collected/required to parameterize one or more aspects of at least one application model. The data model is further associated with one or more aspects of at least one application model, and identifies the data required for each aspect, and further identifies one or more data collection modules (1255) that are used to collect information about the identified specific aspects.

Data models are stored in a data model store (1275) of the TMS.

6.3.3 Data Collection and Performance Measurement Modules (1225)

The system comprises one or more data collection and performance measurement modules (collectively data collection modules (1225)), which are executable programs or scripts that are executed one or more times to collect data about a system, using a process called discovery. The discovery process is executed against a source system or against a target system.

Data collection modules are executed by or on behalf of the transition manager component (1240). Representative data collected by the data collection module(s) comprises one or more of:
  hardware and software identification,
  inter-relationships between hardware, hardware and software, and software components,
  specific configuration information associated with hardware and/or software components,
  specific utilization metrics of source and target hardware and/or software components,
  specific performance metrics of source and target hardware and/or software components, and
  data related to required specific attributes of one or more data or application models.

In addition, data associated with any of the above can be input from external sources, including external databases, auto-discovery tools and runbook agents, and user entry using a user interface.

As appropriate, collected data is stored in one or more databases of the transition management system that are associated with data and applications models.

6.3.4 Transition/Migration Templates

The system comprises one or more transition templates, which are definitions for how a first computing component or set of computing component architectures is converted to an alternative computing component architecture or set of computing component architectures. The transition templates include abstracted references to application and data models, as well as specific migration processes and workflows, coupled with assurance information. The transition templates are stored in at least one database of the transition management system and are used by the transition manager (1240) and related components. Migration templates are a subclass of transition templates where the purpose is to migrate a system or component from a source computing system to a target computing system.

The transition template comprises one or more of the following data elements:
  identity of source [object/class], target [object/class],
  template activity list and associated dependencies,
  template activity list performance estimates,
  metrics for testing success/failure,
  logical abstractions of object classes in accordance with one or more application models (e.g. database server, vs. Oracle server),
  status tracking and exception handling to allow mixed human and machine operations,
  references to specific executable programs to perform specific actions,
  references to manual activities (operator escapes and manual process steps),
  grouping information associating a plurality of actions to be completed as a unit before moving on to a subsequent action,
  credentials or operator escape for credentials for use by the executable programs or manual activities,
  references to the verification and validation executable program and component(s) of the system,
  references to application and data models required (provides the data that needs to be filled in for the ETL, scripts),
  templated transition rules for moving an object class from a first instance to a second instance (of the same object),
  templated transition rules for moving an object class from a first instance of the object to a second instance of a similar peer object (e.g. Oracle to SQLServer),
  templated transition rules for moving to or from a known platform (e.g. from Sugar CRM to a Salesforce instance in the cloud), and
  templated actions for machine executed programs and references to external systems (e.g. API calls, injected command line, puppet script, runbook agent programs).

Runbook templates are represented as one or more data structures in the database and embody encapsulated expert knowledge about configuration, performance, platform requirements, related standards, and similar information. Templates are compiled to produce a transition-time executable component (e.g., a runbook or runbook activity). Compilation pre-binds the template with data from the data model. The system may perform just in time (JIT) binding, run time binding, or pre-use binding of data model elements to templates. Binding is performed based upon actual data collected, imputed data collected, or on the basis of expert knowledge about specific classes.

A set of selected compiled templates effective to accomplish a transition process is called a runbook. A template can be used in more than one runbook, parameterized with different requirements, data, or other elements.

Transition templates are stored in a transition template store (1260) of the TMS.

Partial or staged data transitions are a particularly challenging type of migration, as they generally have the characteristic of having very long run times while data is being copied from the source computing systems to the target computing systems. In cases where there are high system availability requirements, the transition workstream from the source to the target requires additional steps, including staged (multi-phase) migration actions, data deduplication actions, data normalization actions. These actions operate as follows:

Staged (multi-phase) migrations are data migrations that occur in two or more stages. They are used when the source computing architecture must continue to operate and process transactions during a migration. The multi-phase migration operates in at least two parts: a first "bulk" transfer that moves the data from a first computing system to a second computing system, and a second "update" transfer that moves only data that has changed since the "bulk" transfer. These are encoded as distinct actions within a template, with the dependency that the bulk transfer must be completed before the "update" transfer. In some scenarios, the bulk transfer can occur in the background (as it may take several hours or days to complete), and the update transfer is performed just before the system's migrations are completed. Various means of identifying the data to be moved in the "bulk" and "update" transfers may be used, depending upon the type of data storage used on the source computing architecture (e.g. checkpoints, transaction logs).

Data deduplication actions and other data cleaning processes) are sometimes needed when multiple siloed applications are migrated to a target computing system in which the data is no longer siloed. De-duplication may be performed using one or more commercial tools that identify and resolve data quality/duplication issues as template actions/runbook agents. The migration templates define the parameters to these data management tools so they properly deduplicate clean the data in repeatable ways. For example, if two data stores in a source computing architecture are being merged as part of a migration, the de-duplicate/merge program requires parameterization on which data source should be considered primary and which should be considered secondary, how records should be matched, and how to handle cases where there are partial (and disparate) data elements in the different data sources. These parameters are stored as part of a template, or in a file (or other external storage) referenced by a template and can be included in any migration workstreams.

Data normalization activities are managed in templates in the same manner as data merge activities.

63.5 Workstream Manager (1250)

The workstream manager component operates in several modes. In a first mode, it models the target system configuration defined by one or more application and data models to determine expected performance of the proposed transition and compares the calculated model results against performance requirements for the proposed transition. In a second mode, the workstream manager performs a "dry run" of one or more runbooks in order to ensure that all elements will be converted and any unmet dependencies, authorization issues, or implementation bottlenecks are identified. In this mode, the runbook being "dry run" does not actually transition the system but allows for the tuning and optimization of the process template to the specific tooling available and the unique operating environment.

The workstream manager can operate using multiple sets of application and data models in order to implement "what if" workstreams, where various models are tested against each other to determine the resulting calculated performance effects of one or more differing configurations. In some implementations, the "what-if" calculations are performed using a separate software program called the "what-if" tool, which produces and dry runs various template scenarios. These templates may be stored in a data store and reused in runbooks.

One particular instance of migration workstream development that TMS supports is the "roll back" or recovery scenario, in which a migration action (or actions) do not complete successfully. In some cases, roll-back is accomplished by clever ordering of the runbook actions, so that cutover of the computing architecture to a newly migrated resource is not performed until after the proper performance of the resource is verified and roll back is the case of not performing a final cutover action (leaving the failed migration in place, generally on additional computing hardware, but unused and unreferenced by the source computing architecture that was being migrated). In other cases, it is not feasible to determine that a newly migrated resource is operating correctly until after cutover (e.g. the resource passes basic functional checks, but the target computing architecture fails to operate correctly as a full transaction load is applied to it). In these cases, "what if" migration workstream development considers the "roll back" scenario and how recent migration actions applied to the computing architecture can be undone. A set of recovery actions are developed, modeled, and tested using the "what if" migration workstream development tools. The "what-if" tool allows users to explore these types of scenarios and develop templates that are includable during runbook construction that affect a roll back of one or more templated actions.

A second instance of migration workstream development activity that TMS supports is for "system resiliency." System resiliency describes the activity of a computing architecture to operate in one or more partial failure modes. Resiliency activities are broken into three groups: requirements, computing system architecture definitions and transitions, and verification/testing, of resiliency.

Requirements (and requirement changes) are modeled against proposed target computing architectures (or even against existing source computing architectures) using the "what if" tool to add proposed requirements to a proposed target architecture and then check that the architecture conforms to the new resiliency requirement(s). Proposed computing architectures that do conform to the resiliency requirements may be virtually adjusted in the "what-if" tool until a computing architecture that meets the requirements is attained.

Once the proposed computing architecture is identified, the "what-if" tool can identify any required migration action changes (by repeating requirement/template selections, or developing new template actions) in order to support the new computing architecture. These actions may then be virtually tested within the 'what-if' tool to determine if there are any unanticipated side effects of the new actions. Similar selection/testing for verification of operation may also be performed by the "what-if" tool.

Once an acceptable "what-if" scenario is developed, the resulting changes in requirements and new or updated templates are written to a data store, where they may be used for runbook construction. If requirements or templates that are in use as part of existing runbooks are effected, the "what-if" tool makes the user aware of any additional activities that must be undertaken to include these new requirements and/or templates into the existing runbooks.

The "what if" tool may also be used to model failures of aspects of a target computing architecture in order to virtually test the resiliency of the target architecture by simulating failures or partial failures of one or more computing components or systems. This allows the user of the "what if" tool to identify changes in the architecture to correct any resiliency issues identified in the process as described above. For example, the "what if" tool can test portions of a no single point failure" resiliency requirement against a DNS server by virtually failing the DNS server and ensuring that there is a configured backup DNS server in the computing architecture being tested.

6.3.6 Transition Manager (1240)

The transition manager component executes one or more runbooks, data collection modules, and verification and performance measurement programs. The transition manager also converts uncompiled transition templates into runbooks, and as part of that compilation, binds the resulting executables with one or more data elements represented by a data model. The compilation and binding is performed by the template compiler (1245) pre-use, Just-in-Time (JIT) (e.g. as a runbook is about to be used), or at runbook execution.

Transition template execution implements the migration transition from the source system configuration to the target system configuration as a series of transition actions. Activities are transition actions that are performed by, in whole or in part, a human operator. Tasks are automated process actions that are performed autonomously by the system with minimum or no operator intervention. The actions are performed in series, in parallel, or in a defined sequence that can include both series and parallel actions (as defined by the templates and runbooks).

Tasks are generally fully automated, except for authentication in some cases. Fully automated actions are described above, or compiled transition/ETL scripts that implement the transition tasks using the parameterized data in the data model. Some tasks are substantially automated, requiring only that an authorized operator enters system-specific authorization credentials required for the task to successfully execute. This operator's credential permits the transition management system to operate in sensitive configurations, where common credentials are not established for each system, or where credentials may not be stored in the automation. In these cases, the administrator credentials required are provided JIT by the administrator monitoring the task.

One aspect of tasks is that they often use dedicated programs to perform specific transition actions. These dedicated programs, called runbook agents, are referenced by the templates, and are executed by the transition management system to perform the task with minimal (if any) intervention by the operator.

Unlike tasks, activities are not fully automated and require operators to perform specific actions on a designated system or application. Activities are used when the actions are not feasible to automate, or for which there is too much variability in the actions taken to be able to automate them. An example of an activity is an initial action that involves the physical insertion of media into a drive, or the physical replacement of media or a drive.

After a specific portion of a runbook is completed (in whole or in part), the transition manager component implements one or more verification actions by using one or more data collection modules to collect one or more target system metrics, and the newly collected metric(s) are compared against one or more business requirements (e.g. performance). The verification actions may be performed directly by the transition manager component, or by a separate verification manager component (1235). One or more verification action(s) can be repeated as many times as necessary in order to confirm the target system and subsystems are operating properly during transition actions (and/or periodically to account for time-of-day or seasonal differences).

The transition manager further comprises two software programs that are used within the TMS to implement transitions. The first is the runbook agent program (1241) which implements one or more aspects of a transition template/runbook. There can be several types of runbook agent programs, each specialized for the management of a specific transition template/runbook activity. The second is the discovery agent (1243), which is used by the TMS to collect configuration and dependency information from network attached systems (e.g. source computer systems, target computer systems, external services). Again, there can be multiple types of discovery agents, each specialized to obtain configuration information from a system, a software application, or a service. The discovery agent programs save the collected configuration and dependency information into one or more data structures and store the information in a data store of the TMS.

In some implementations, automated transition actions are performed by existing prior art deployment tools such as Puppet or Chef, with the runbook providing the parameters required for the deployment tools to operate. Similarly, specific migration actions are performed using existing prior art migration tools for moving systems and databases, again, with the runbook providing the parameters required for the tools to operate. These repurposed prior art programs are a class of runbook agents, as described above.

6.3.7 Business Requirement Representations

The transition management system comprises one or more business requirement representations (encodings) that describe requirements of the transition process and/or the resulting (target) system configuration and its operational performance. The business requirement representations are encoded as one or more data structures stored in a database (e.g. specification/requirements store (1280)) of the transition management system.

Example business requirements are related to system and subsystem availability, performance user experience, compliance, and maintaining business flexibility during migrations, modernizations, and steady state operations.

6.3.7.1 Example 1: Assurance of Application Software Availability

Application software availability requirements may include:
  An encoding of the requirement that there will be no unexpected downtime during a transition action.
  An encoding of a further requirement that all functions of the application must remain accessible and that this requirement is applicable to all systems used by an application, including those provided by loosely connected, external systems.
  An encoding of a requirement that any service disruption to users must be contained to defined maintenance windows (generally non-critical hours of the day, days of the week, and seasons of the year), An encoding that all underlying infrastructure (upon which the architecture depends) must also meet one or more specified target availability requirements.

An encoding of the requirement that response times must be under XX seconds.

Implementation of any of the above requirements requires adequate monitoring of the application performance vs. the requirements as well as the availability and recovery of each individual component in the application system.

6.3.7.2 Example 2: Application Software Performance/Acceptable User Experience Exemplary application software performance/user experience requirements may include:
An encoding of a requirement that the end-tip-end application must meet performance targets (transactional load and response time).
An encoding of a requirement that response time performance targets are measured by response times of end user functions regardless of how many subsystems are being exercised.
An encoding of a requirement that user expectations must be properly managed when there is a deviation of more than X % to the stated performance targets.

6.3.7.3 Example 3: Compliance

Exemplary compliance requirements may include:
An encoding of the requirement that notifications must be made of any infosec holes or violations created by a transition action, recovery, or application modernization process.
An encoding for health care applications (only applies to healthcare applications), that there are specific requirements for chain of custody of assets to assure HIPAA compliance.
An encoding that systems that handle personally identifiable information are identified and have compliance legends in user and administrative notification locations.
An encoding of GDPR requirements for the identification of specific storage locations of the system, and the disclosure, management, and tracking of all "subprocessors" (additional systems) that access or use the data. Other personal data protection requirements may be similarly encoded and used in conjunction with the example encoded GDPR-requirements.

6.4 Processes of the Technology

Figure 2A:
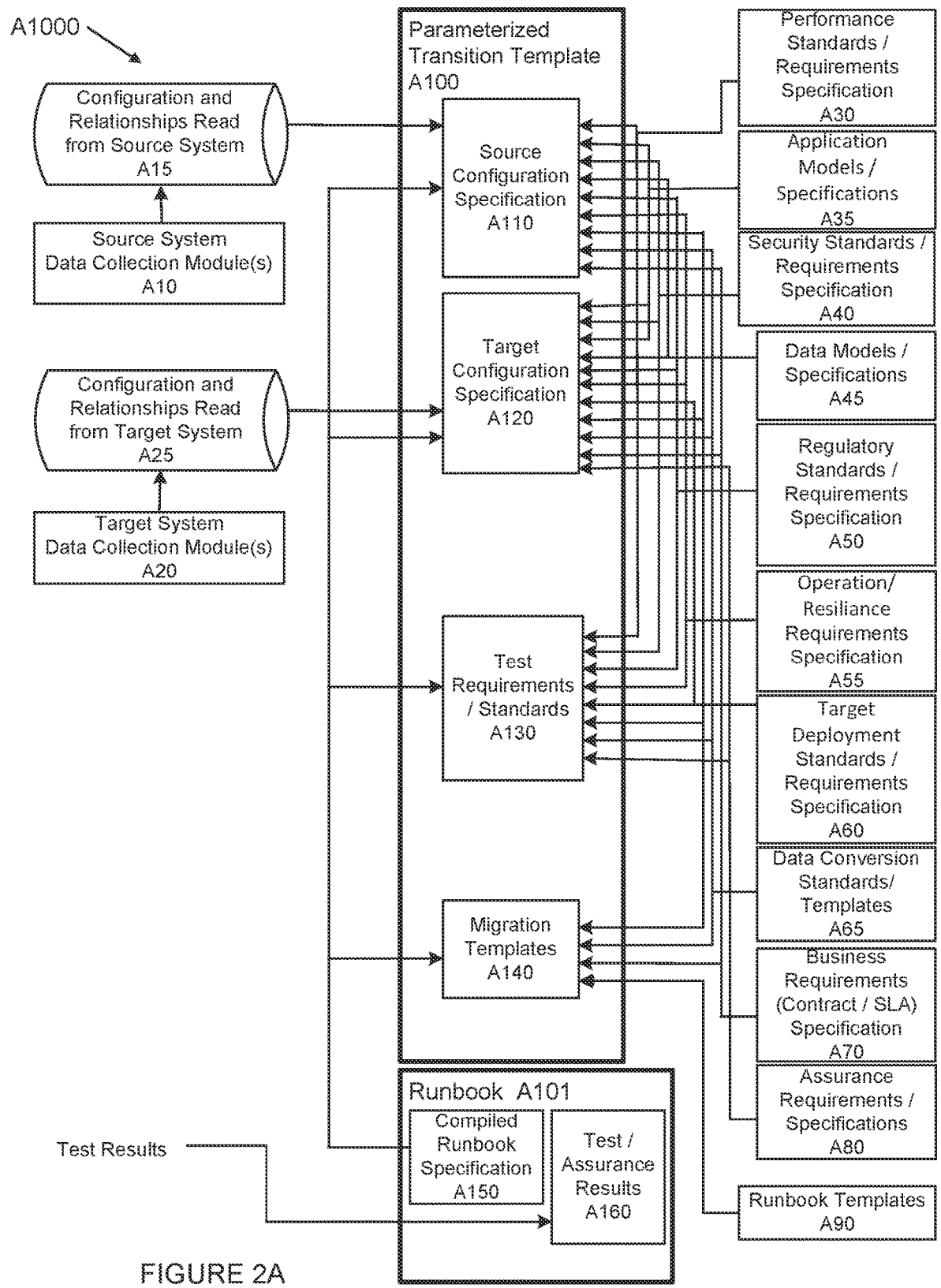
FIG. 2A illustrates the template and data sources that make up a transition template and runbook.
Figure 2B:
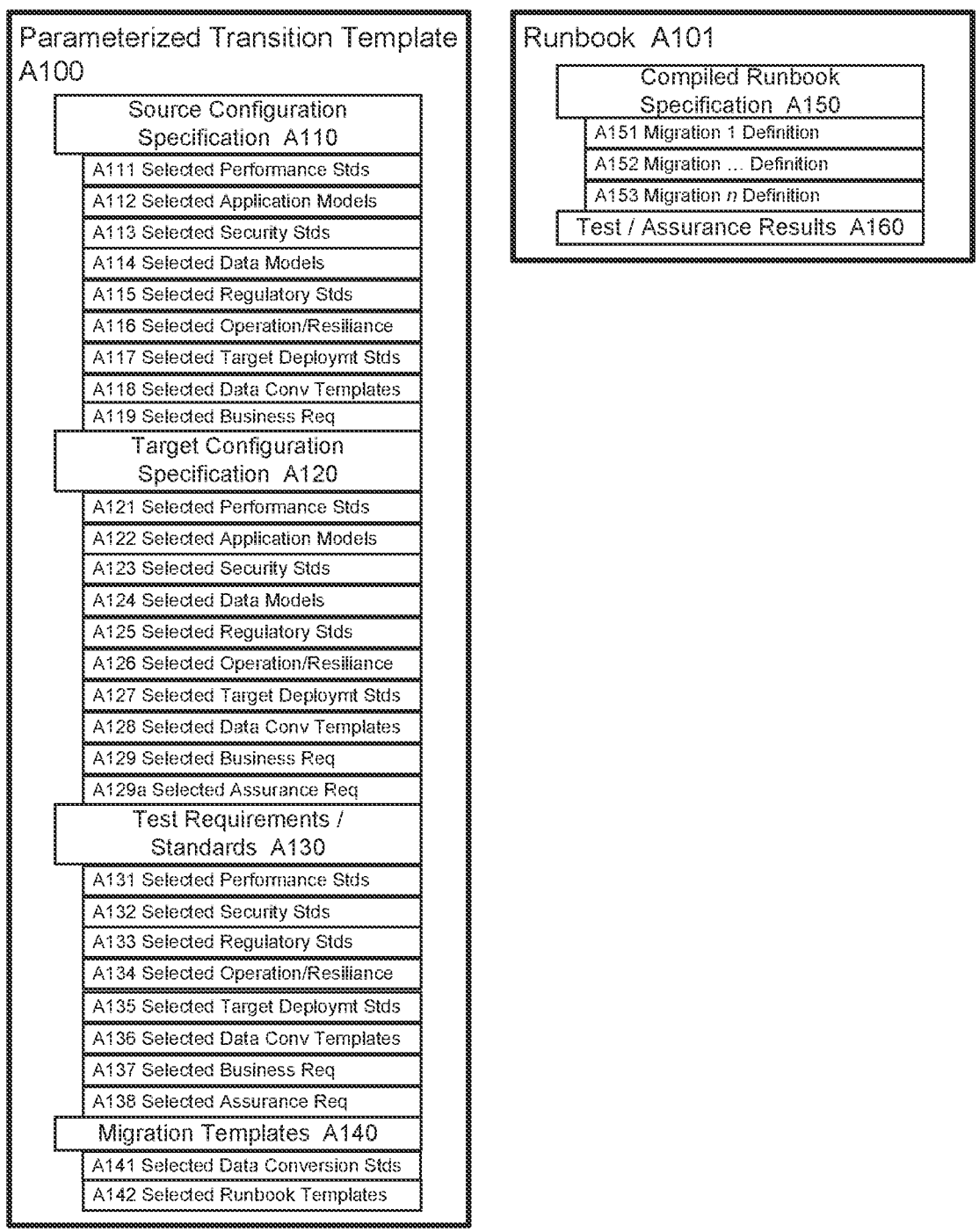
FIG. 2B is a detailed illustration of an exemplary Transition Template and Runbook data structures.

As described above, the transition management system (TMS) operates by collecting information about the transition into a collection of templates, which are then aggregated and checked by a compilation process, and then implemented by the transition management system in order to transition a first computing architecture to a second computing architecture. FIGS. 2A and 2B provide further detail on the template and runbook data structures as managed by the transition management system. FIG. 2A illustrates the template and data sources that make up a transition template and runbook. FIG. 2B is a detailed drawing of the Transition Template and Runbook data structures.

In FIG. 2A, the TMS collects (or causes to be collected) information about the source and target computing architectures (data collection modules A10, A20) (e.g. data collection modules 1255 of FIG. 2), which produce one or more templates describing the configurations, dependencies, software versions, data, and the like. This information is added to a transition template as part of the source configuration specification (A110) and target configuration (A120) specification. Other aspects of the configurations and the desired transition information and requirements are extracted from a plurality of specification templates that the TMS determines are applicable to the transition, e.g. performance standard/requirements specification (A30), application models/specification templates (A35), security standards/requirements specification (A40), data model/specification template (A45), regulatory standards/requirements specification (A50), operation/resilience requirements specification (A55), target deployment standards/requirements specification (A60), data conversion templates (A65), business requirements (contract/SLA) specification (A70), and assurance requirements (A80), The extracted materials are added to the transition template as shown (A111, A119, A121, ... A129a, etc. Note all transition, standards, and requirements templates are applicable to each aspect of the transition, and the types of templates and transition actions for which templates may vary for each transition type. The process of extracting materials from source and target computers systems and relevant requirements, and adding this extracted information to one or more transition templates is referred to as parameterization, and the resulting templates) are called parameterized transition templates. The parameterized transition template (A100) (e.g. 1271 of FIG. 2) is stored in a data store (e.g. 1270 of FIG. 2) until it is ready to be compiled.

The parameterized transition template (100) is then compiled into a runbook (A101) (e.g. 1273 of FIG. 2), which includes the completed specifications (or references to the completed specifications in the transition template), along with the detailed migration steps to be performed for each migration (e.g. migrations A151, ..., A153). Any number of migrations and migration steps may be defined in the runbook, as defined by one or more runbook templates (A90) and the above referenced specification templates. The compiled runbook comprises copies of the relevant portions of the transition template and/or references to the transition template and/or the originally referenced specification templates. The compiled runbook is stored in a data store.

Once the runbook is compiled and the transition begins, the TMS encodes and stores transition activity states and test results in the runbook, as indicated for test/assurance results (A160).

Figure 3:
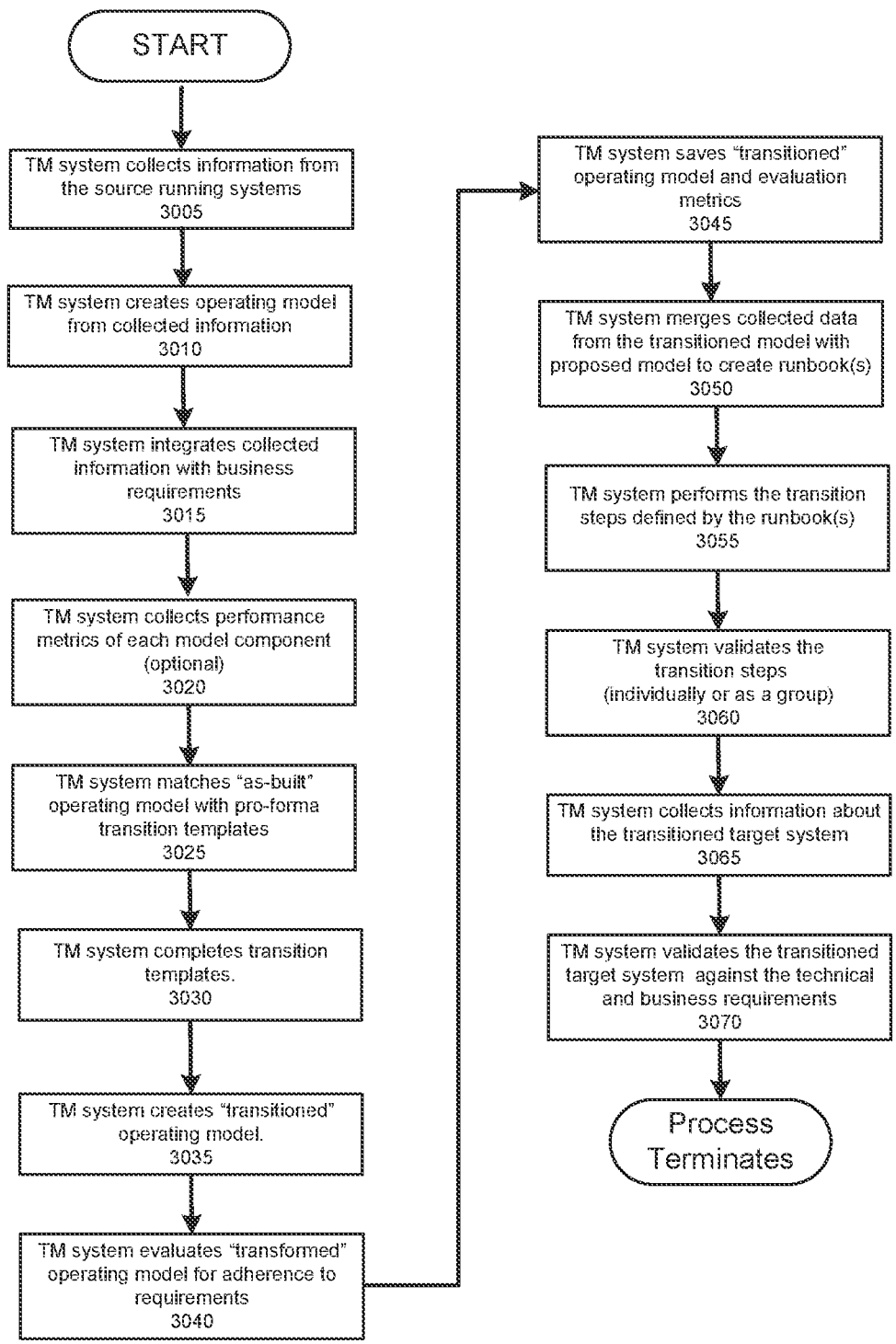
FIG. 3 depicts an exemplary process flow of a transition management process.

The described system provides one or more transition management application programs that operate as follows, as depicted in FIG. 3:

First, the transition management system collects information from various (source) running systems (step 3005) in order to create an operating model of all application software and infrastructure (including cloud and SaaS)(step 3010). This information is integrated with applicable business requirements (e.g. application functional requirements, required metrics and KPIs), definitions, and business and technical goals (as defined in the system)(step 3015). The current operating performance metrics of each component of the model are optionally collected (step 3020).

Second, the combined integrated "as-built" operating model, requirements, and goals is then matched to one or more pro-forma model transition templates (step 3025), and the templates are completed under control of the system (step 3030). The resulting "transitioned" operating model is created from the completed templates and defined requirements and goals (step 3035). The resulting transitioned operating model is evaluated to determine if any of the proposed transition actions violates one or more of the applicable business requirements (step 3040). The transitioned operating model and evaluation metrics are saved for subsequent testing and validation (step 3045).

Third, once the proposed transition set has been validated, transition expert systems and embedded expertise, and collected data from the transitioned operating model are merged with the proposed model to produce one or more completed transition workstream, aka "runbooks" (step 3050). A runbook describes a set of customized actions required to transition the current running computing architecture into the proposed computing architecture and to assess the functionality of the transitioned architecture.

Fourth, the system performs the transition actions defined by the runbook(s) to transition the source computing system (step 3055) to the target computing system. Each task or activity is automatically followed by one or more validation actions to check the results of at least one transition action (step 3060). These validation runbooks are performed after a single action, or after a group of actions (phase), or upon completion of the end-to-end transition.

Fifth, the system collects information about the transitioned (target) system(s) (step 3065) and uses that information to validate the transitioned architecture against the technical and business requirements to ensure the transitioned system(s) are functional and that they perform as expected (step 3070).

The data collection and performance checking processes are repeated on an ad-hoc basis to monitor and validate the resulting transitioned system on an ongoing basis.

6.4.1 Data Collection Processes

The data collection/generation processes comprise three independent activities, each of which can be performed independently or in conjunction with other activities:
  Automated data (configuration and performance metric) collection and normalization.
  Manual information entry (business facts and IT facts that are not auto-discoverable).
  Target architecture specification.

The configuration and performance metric collection activity is performed to identify the configuration of existing (source) IT systems and applications, and to record this information in a normalized form within a data model of the transition management system. The activity begins with an automated component identification, and/or the manual entry of component identifications, of source architecture, computer systems, and applications. A user of the transition management system can participate in the data collection process by identifying aspects of the source architecture, computer systems, or applications so that the data collection programs are then executed using previously entered or discovered information. In this way, the source architecture, source computer system(s), and source application(s) are all discovered, enumerated, and their configuration elements captured.

In some implementations, automated component identification programs are executed against a network to discover all of the systems present on the network, or against specific (identified) source computer systems. Data collection is performed autonomously or semi-autonomously using one or more data collection programs. In some cases, the data collection is performed automatically after a user of the transition authorizes access to the target system/application.

The manual information entry activity is performed by a user of the system to manually identify source architectures, specific computer systems, and specific applications, as well as to identify other services relied upon by the source architecture(s) and to enter this information into a database of the system. The information entered by the user is guided by one or more data model templates, and the resulting collected information is added to one or more data models of the transition management system.

The target architecture specification step is performed by the user to identify the target architecture, systems, and applications, and to further identify requirements applicable to the target. Requirement specifications are selected from a database of the transition management system or are manually entered by the transition management system user.

The data collection process is iterative in nature, in that collection activities are iteratively identified by the system and the process is repeated until the user of the transition management system is satisfied that all source systems and applications are identified, characterized, and their configurations captured. In some cases, the transition management system identifies missing data elements that are specified by one or more data models and undertakes directed actions to identify and collect those missing data elements. The results of the identification and characterization activities are stored in one more data stores.

A similar identification, characterization, and configuration capture is performed for target systems when they are identified.

6.4.2 Transition Definition Generation Process

The transition definition generation process begins with the user identifying the purpose of the transition and one or more target architectures, computer systems, applications, and/or target requirements and storing this information in a data store of the transition management system. The transition management system then utilizes one or more databases of known transitions (as encoded in transition templates) and identifies and associates any identified transition templates that are suitable for use to effect the desired transition. In some embodiments, the association is based upon one or more attributes stored a data model. Alternatively, the association is based upon one or more identified attributes or components of a system. In other embodiments, a transition management system user manually enters one or more transition templates into the system. The user also selects and/or affirms the system-identified transition templates. The identified transitions are then associated with one or more target architectures, computer systems, and/or applications.

Similarly, the transition management system automatically identifies requirements to be associated with the target architecture, computer systems, and/or application(s), and stores the requirements and their associations in a data store of the system.

The collection of identified transitions is processed by the transition management system to identify missing transitions, and the system user provides the missing transition information or selects one or more alternative or additional transition templates. The system also matches identified source configuration elements collected during the data collection processes with configuration elements and their values identified by the specified transitions, and the data collection process is repeated to identify/complete any missing configuration elements. Data refinement/augmentation and algorithm tuning is performed in the system during this step as necessary to further tune the transition process in an iterative fashion. Additional transition templates may be selected and associated as necessary to completely transition all aspects of a source system to a target system.

An aspect of the transition definitions is that they identify whether applications and operational data are to be managed using waterfall or DevOp techniques, and identifies the current tools available in the environment that should be used for managing the transition of each type of application. In some cases, these tools may be deployed as runbook agents, in other cases, their use may be encoded as part of one or more activity definitions.

In some implementations, the transition definitions include specifications for use of external or pre-existing software tools in the source or target computing architectures for reading configuration data, setting configurations, etc. Examples of these tools include Puppet and Chef for configuration management and application installation/deployment actions.

Completed transition definitions are optionally validated (or revalidated) and stored in a database of the transition management system. In some embodiments, current performance metrics and configuration information of source and target components are collected, and these data elements metrics validated against the associated requirements. For example, information about the performance of a network link between two target components is collected and validated to ensure that there is sufficient network bandwidth for the target systems to operate in accordance with requirements. Similarly, the transition management system collects information about a target configuration, such as the size of attached disk storage, and then validates to ensure that the target computer systems/architecture has sufficient disk storage to complete the transition and to perform within the requirement specifications. In another example, the validation is performed against the transition actions to ensure that the computer systems and applications being transitioned continue to meet their operational requirements for uptime and performance during the transition. The validation may be performed as part of a specific runbook, or may be implemented as a separate validation (e.g. IV&V) runbook. For example, the validation actions can be encoded as runbook actions that can be performed using a calculation using asset or algorithm attributes, and by controlling performance testing tools to execute and validate.

In some implementations, a transition action is identified as repeatable. Repeatable steps are re-processed as often as desired; for example, a process to copy recently updated data from a first database to a second database is run as many times as necessary to copy data on systems that are being transitioned while "live."

Estimated transition action times and time dependencies and default transition action ordering information is determined during the transition definition creation. For example, the estimated length of time for processing a specific transition action is calculated and stored with the activity definition. Alternatively, the estimated length of time may be taken from prior executions of a runbook, may be provided within the encoding of a template, or may be manually entered by a user. Similarly, time-specific dependencies (e.g. maintenance windows, required uptime windows) are incorporated into the step ordering and workstream development processes. Steps are optionally reordered to honor dependencies, operational requirements (e.g., windows), and available working resources.

Estimated times are validated each time a runbook is executed, and the results recorded for subsequent use. In some cases, the results of the execution are added to a template containing the estimated times. The actual execution times and the estimated times may be displayed on the user interface (for example, in a dashboard or monitoring program [not shown]).

Exceptions are logged and/or presented to the transition management system user, and once corrected, any necessary data collection/transition definition generation steps are repeated.

6.4.3 Runbook Generation Process

During the transition definition generation process, one or more "runbooks" is generated from the transition template and model definitions. Runbook generation includes the automatic sequencing of transition template actions, associating transition actions with one or more responsible users and systems, and identifying the information and security credentials/accesses needed to perform each of the transition actions.

The transition templates and associated data model information are converted to a runbook by a runbook compiler, which binds templates with their associated data, execution actions, action dependencies, and verification actions and stores the compiled runbook as a data structure in a data store of the system. The compilation process is performed as a batch, or deferred until execution using just-in-time bindings.

6.4.4 Transition Execution Process

Transition execution process(es) (generally, the transition management activity(ies)) execute one or more runbooks, reading the identified runbook actions and either executing one or more automated processes identified for the action, or by prompting the responsible user to undertake specific activities in order to implement one or more of the specified actions. Transition actions are selected for execution based upon the completion status of previous actions, and action inter-dependencies identified above. As each transition action is completed, its completion status is tracked by the transition management system (and optionally displayed on the transition management system user interface [not shown]) and any action-specific verification actions are also executed to confirm the successful completion of the transition actions. Errors identified during each action-specific verification action are managed by the system by setting the completion status of the action to failed, automatically re-running the transition action, or by notifying the user of the transition management system (either the user assigned to the action, or a management user). Verification actions results are also logged.

One aspect of the transition execution process is that it honors business requirements for application availability and uptime. Sometimes, the transition execution process identifies a user request to perform one or more transition activities, which upon analysis by the transition execution process, produces a violation of one or more business requirements (e.g. the selected process action(s) are expected to run over into required availability windows). The transition execution process generates an exception, sends it to the user, and prompts the user for instructions on how to proceed. In other aspects, the transition execution process schedules specific process action(s) to be performed at a specified date/time, and prevents the scheduled process action from starting if it cannot be completed (or is not expected to complete) within the specified time requirements. The transition execution process maintains a current state of the process action(s), and their projected execution time windows, and suspends transition activities when necessary. In some implementations, the transition execution process monitors computer system loads and limits/release transition process action(s) for execution when computer system load conditions meet defined requirements.

6.4.5 Verification Process

After the transition execution processes are complete, the transition management system optionally undertakes a verification process by which the operation of the target architecture, computer systems, and applications are monitored to ensure that the transitioned system is operating as specified. Verification process action(s) are performed using the same or differing security credentials as the transition activities described above.

6.4.6 Runbook Execution

Figure 4:
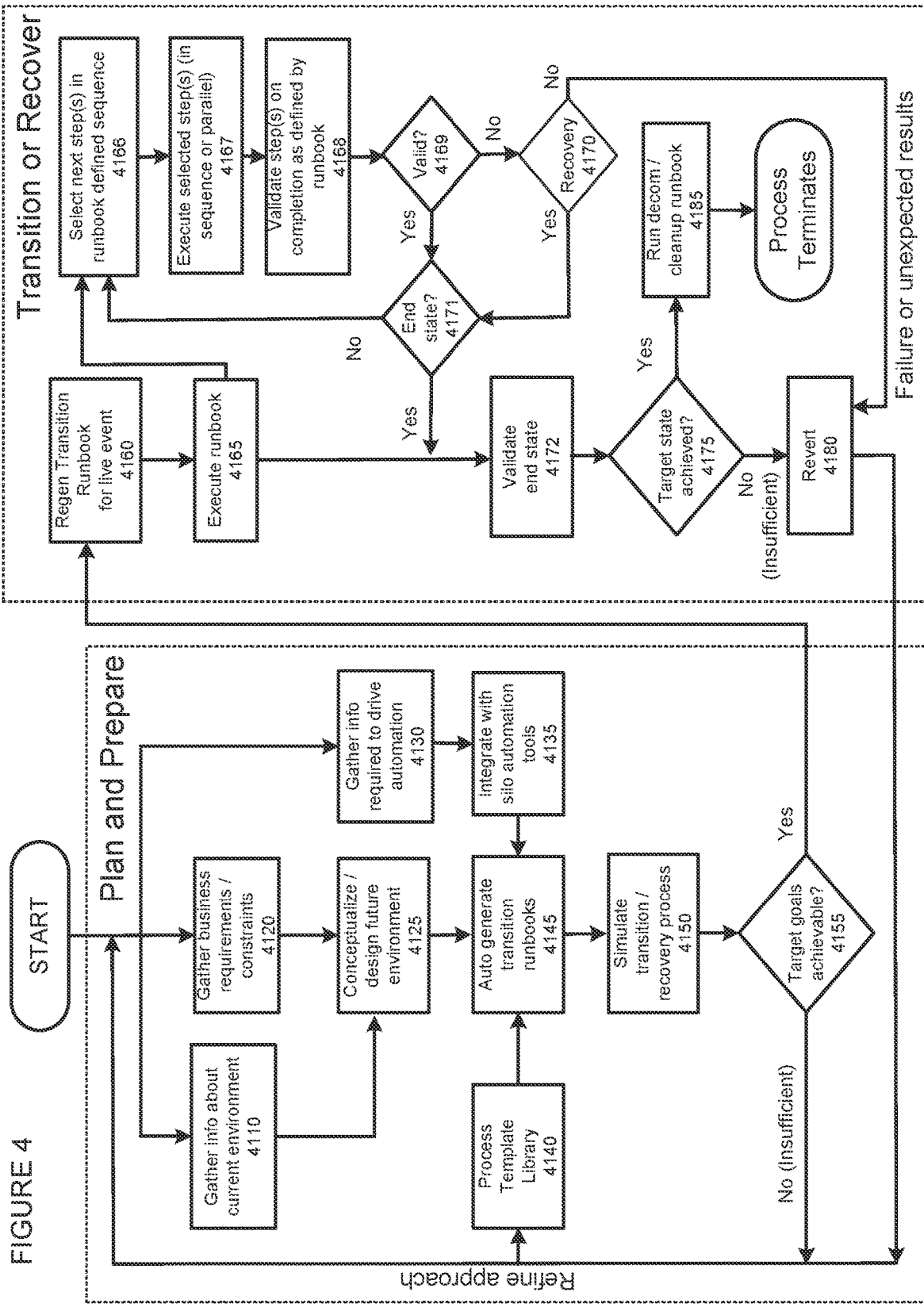
FIG. 4 depicts an exemplary process flow of a further embodiment of a transition management process.

FIG. 4 is a flowchart illustrating the overall runbook process. During the workstream development and preparation phase, the system simultaneously gathers information about the current environment (4110), business requirements and constraints (4120), and information required to drive automation (4130). The information acquired in (4110) and (4120) is used to conceptualize/design the future environment (4125). The information acquired in (4130) is integrated with silo automation tools (4135). The system next automatically generates runbooks (4145) using (4125), (4135), and a process template library (4140) as inputs. The system then simulates the transition/recovery process (4150) to test the configuration. If the target goals are achievable ("yes" branch of 4155), the system proceeds to the transition or recovery phase. If the target goals are not achievable ("no" branch of 4155), the system updates the process template library, refines its approach, and cycles back to the information gathering steps.

During the transition or recovery phase, the system regenerates the transition runbook (4160) for a live (vs. simulated) activity. The runbook then executes (4165) by selecting the next action(s) in the runbook's defined sequence of actions (4166), executing the selected actions(s) (in sequence or in parallel) (4167), and validating the results of the action(s) upon completion as defined by the runbook (4168). If completion of the action(s) is valid ("yes" branch of 4169), and the transition process defined by the runbook has not reached an end state ("no" branch of 4171), the process cycles back to (4166) to select the next action(s) in the runbook defined sequence. If completion of the action(s) is not valid ("no" branch of 4169), the process proceeds to recovery (1170). If recovery is possible ("yes" branch of 4170), the process proceeds to the end state check (4171). If recovery is not possible due to failure or unexpected results ("no" branch of 4170), the process proceeds to a reversion action or actions (e.g. roll back the changes) (4180), which then returns the process to the workstream development and preparation phase for further refinement.

If the execution of the runbook action(s) reaches an end state condition where all actions have been executed successfully and there are no further actions to execute ("yes" branch of 4171), the process proceeds to validation of the end state (4172). If the target state has not been successfully achieved ("no" branch of 4175), the transition process proceeds to the reversion action or actions (4180), which returns the process to the workstream development and preparation phase for further refinement. If the target state has been successfully achieved ("yes" branch of 4175), the system runs decommissioning/cleanup runbook actions (4185) and the process terminates.

6.4.7 "What-If" Process

Figure 5:
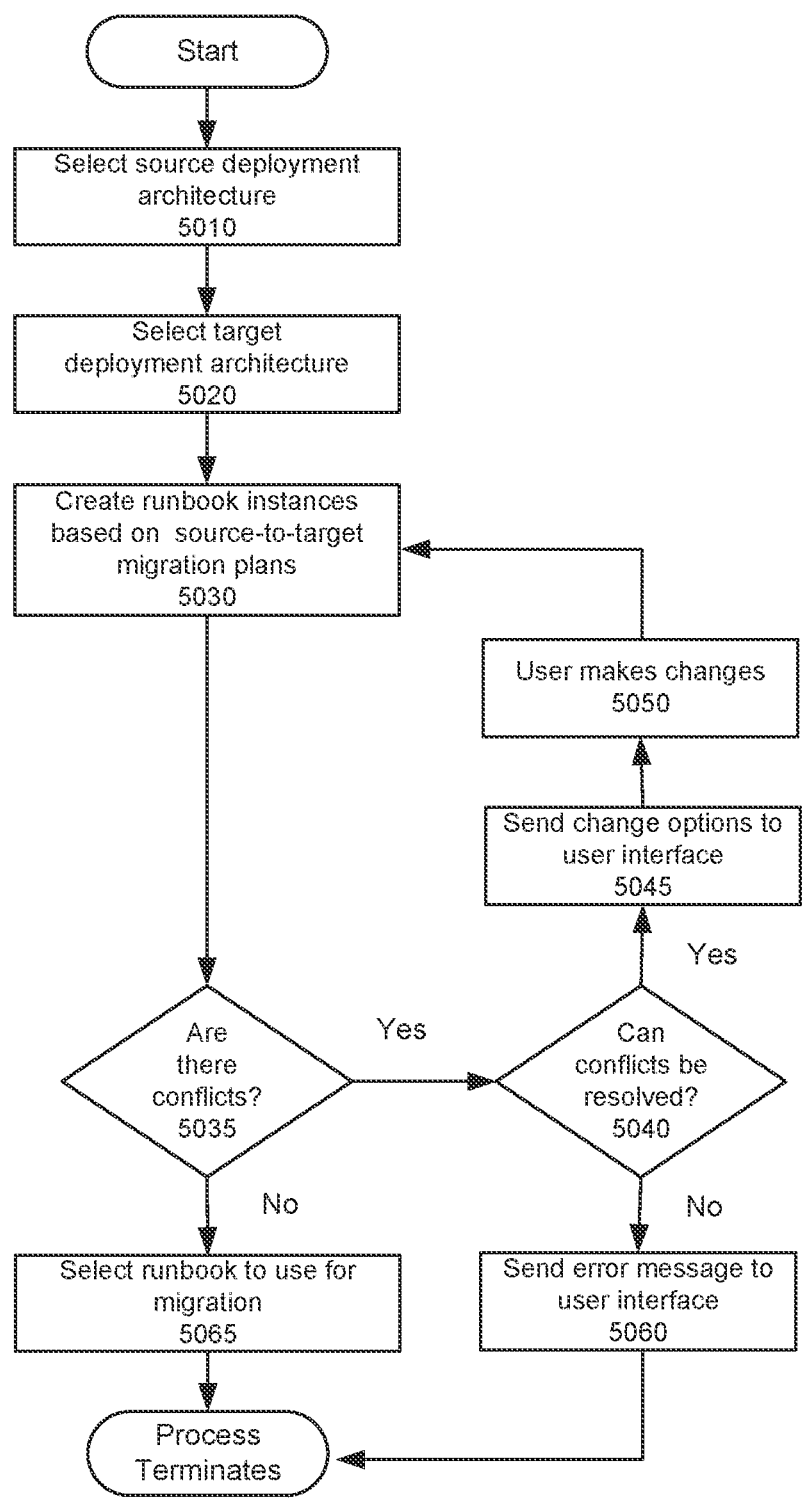
FIG. 5 depicts an exemplary process flow of an example embodiment of a "what if" conflicts detection and resolution program.

The "what-if" analysis program (MAT) of the TMS is used to run "what-if" scenarios without actually performing a transition. This tool enables the user to run multiple scenarios to determine an optimal transition approach for a target deployment architecture. FIG. 5 depicts a flowchart of the "what-if" process as implemented by the TMS.

In step (5010), the user selects a source deployment architecture, running a discovery process, and then confirming the results. In this step, the user also has the ability to deselect discovered components so they are not included in the what-if migration scenario. Other options can be selected/rejected in this step. Some of the other options are derived from policy inputs instead of user inputs.

In step (5020), the user selects a target deployment architecture by making a selection from a library of available migration targets (e.g. Azure cloud, . . . ). The selections are parameterized transition templates containing default policies that are selected from the policy store and applied automatically. The user has the ability to override these policies on a runbook-by-runbook basis. Some policies in the store are marked as default and are used automatically.

In step (5030) the WIAT automatically creates a set of runbook instances from the cross of source/target deployment architectures, fully populating the runbook instances from the collected configuration information and available migration options. Policy inputs are used for certain decisions.

In step (5035), the WIAT checks for conflicts or exceptions that need to be resolved before the "what-if" migration can be successful. If there are no conflicts ("no" branch of 5035 decision), the process proceeds to step (5060). If there are conflicts ("yes" branch of 5035 decision), the WIAT sends error message(s) identifying the conflicts to the user interface and proceeds to step (5040).

In step (5040), the WIAT analyzes the conflicts or exceptions identified in step (5035). If there is a possibility of resolving the conflict ("yes" branch of 5040 decision) the WIAT presents the user with selectable options on the user interface (5045) for making alterations to the target or source deployment architecture information (5050) to resolve the conflict and return to step (5030). If the WIAT analyzes the conflicts or exceptions and no resolution is possible ("no" branch of 5040 decision), a message is sent to the user interface (5060) describing the reasons why, and the process terminates.

In step (5065), the user selects the migration scenario that they want to take, it is saved as a parameterized runbook, and the "what-if" process terminates.

6.4.7.1 Example Non-Limiting Use

The TMS discovers a local (in-house) DNS server that needs to be migrated from an in-house DNS server to a new hosting environment. The DNS server is hosted on a dedicated computer that also hosts DHCP and identity (iDP) servers. Approximately thirty client computers use the DNS service; they obtain the DNS server (to use) information from the DEI CP service when they obtain their IP addresses for the network. These clients depend upon having accurate DNS information to resolve the location of the identity server. Once these services and relationships are discovered, a virtual model of the source computer system architecture is constructed, and one or more proposed deployment architectures are selected. Applicable policies for redundancy and security are also identified at this time. The selected deployment architecture definitions and policies, in conjunction with one or more transition templates, are used to determine the migration options and requirements for migrating the existing computer system components to each of the proposed deployment architectures. The selected policies are used to further determine required or desired attributes of the resulting deployment architecture(s), Once a deployment architecture is selected for rollout, the system parameterizes the transition templates with source and target component information and uses the parameterized transition templates to determine the action(s) required to perform the migration. Dependencies between the migration action(s) are then determined, one or more migration runbooks compiled for the migration, and the migration runbooks are managed by the TMS through completion of all migration actions and testing that the migrated services have been properly migrated and are again operational.

In the specific example use case described above, there is an identified dependency of the DHCP server configuration that identifies the location(s) of the DNS server. A first template is selected that specifies the automated conversion of the DNS server from the in-house server to an external DNS provider. This template utilizes a runbook agent program to automatically copy the DNS information by interrogating the local DNS server and creating new configuration files for the target DNS service. A second template is identified based upon the dependency between the DNS and DHCP service, in which an operator is prompted to reconfigure the DHCP service to reference the new DNS service location.

The exemplary runbook comprises a sequence of automated tasks that migrate and test rehosting a DNS provider. The runbook executes each of the runbook tasks autonomously, these tasks automatically copy the DNS information from the source DNS service to the selected external DNS provider, starts/restarts the new DNS service on the target server, and then checks that the external DNS provider is properly responding to DNS requests. This set of tasks are then marked as provisionally complete, and a second set of runbook actions are executed, which prompts the operator to make a configuration change in the local DHCP service configuration, automatically checks the result, and then downs the source DNS service after a suitable elapsed time. Once the operator indicates this change is complete, the DHCP service is automatically restarted and the information provided by it is checked (via an executable runbook agent that interacts with the DHCP service using the DHCP protocol) to make sure it is serving the new DNS server address as part of its configuration parameters. When the DHCP service is confirmed to be serving the correct values, the system waits at least the amount of time to trigger DHCP lease renewal (configurable in the transition template based upon expert knowledge and the configuration of the DHCP server lease expiration time). This wait causes all outstanding DIRT leases issued by the source server to expire and be replaced with new leases in order to ensure that all leases are renewed with the new information. The runbook then automatically disables the source DNS service to complete the transition.

6.412 Example Disaster Recovery Use Case

Disaster recovery is generally recognized as a complete failover from one compute environment to another, for example, a server and its applications failover to a new server, or a complete data center fails over to a different data center. Generally, these failovers must be accomplished without access to the failed system (meaning that the configuration and data on the system is not available), and must be accomplished as soon as possible, as the failure has caused loss of function to one or more business areas (if not a complete shutdown of a business). Thus. DR activities often add risk to other areas of the organization which were not affected by the disruption/event. As a result, organizations generally do not have confidence in their DR approach and will go to great lengths to avoid a failover. These organizations are more likely to search for root cause and then remediate whereas the business would prefer an approach of recovery first, then correct later.

Disaster recovery (DR) and application recovery thus represent a special type of migration actions, where part of the migration is performed before the system failure, and a second part is performed in response to the system failure in order to recover from the failure. While a partial or full recovery is very similar to a migration from a defined computing architecture state A to a computing architecture state B, there are also significant differences. One significant difference is that disaster and application recovery procedures for most organizations start from a static definition of one or more systems and how they were originally installed. These procedures often do not account for operational and configuration changes made "on the fly" by system administrators. Recovery runbooks provide the processes that capture these changes in system configuration on a periodic basis and automatically update the recovery runbook to capture this newest information. They also provide for the recovery of data, and the periodic monitoring and checking of data transfer actions in the time before the recovery is needed. Recovery runbooks provide the missing necessary automation to address recovery, recognizing that recovery is a reaction to an unexpected disruption of one or more computer systems. Lastly, most disaster recoveries are performed over a period of several days or weeks. Some computer systems and applications are more important for ongoing operations than others, so it is often necessary to change the recovery processing order to bring back critical computer systems and data first, followed by less essential computer systems and data later.

This approach addresses these challenges of DR in several ways:

Runbooks can be regenerated at recovery time using current, standardized procedures and based on a comprehensive and current data model representing the affected environment, periodically generated and stored in advance of need using the current data model representing the affected environment.

Runbooks can be generated on an application or service area basis and encode domain specific knowledge from the templates about the configuration, migration, performance, and dependencies of one or more systems and applications, with actual implementation details and current as-built architecture details. This allows for coordinated failover/recovery of specific applications. For example, you can create a "Tier 1 Recovery" runbook to quickly restore the most critical applications first without triggering a full DR event between two compute centers.

Complete and partial recovery templates and runbooks can be periodically audited, and validated with changes to the transition templates as appropriate based on an evolving information technology environment.

In this example, the TMS is used to manage a special case of transition for disaster recovery. Existing disaster recovery tools focus on the migration of data and applications, but do not address maintaining ongoing operational requirements during the failure/disaster recovery transition process. For example, existing disaster recovery tools recover a database from the last known good backup, but do not address interim changes in the database between the backup and the time of the disaster.

The TMS accomplishes this by using a runbook that never completes, but rather the runbook repeats one or more transition actions on a periodic basis to ensure that computer system and database configurations (and the data itself) are being continually migrated to the disaster recovery (e.g. the target) computer systems without performing any "cutover" actions (where load/routing is transferred to the target system, such as redirecting the DNS names that point to the operational system). Once a disaster is determined, the runbook actions are allowed to complete the migration and the "cutover" actions.

In this way, the TMS can function as a disaster recovery management system.

6.4.7.3 Example—IV&V Management

In this example implementation, the TMS functions as a third party IV&V management system that periodically validates the operation of a running computing architecture for compliance with one or more standards and provides a certification of the results. For example, if a computing system has data separation and protection requirements (such as those imposed by GDPR or VISA) and had additional business requirements for certification of data separation/protection compliance, a TMS runbook is used to automatically determine compliance of the target system architecture and data with a set of defined requirements specifications. The resulting pass/fail result of the runbook is used as an automated certification of the system's compliance with the defined business requirements.

In this example implementation, the TMS identifies the source system (there is no target system), the applicable standards and requirements, and the computing components that are affected by the applicable standards and requirements. A runbook is constructed to monitor the affected components and their configurations. On a periodic basis, the runbook is executed by the TMS, which results in the re-collection of source component configurations, and the evaluation of these configurations against the applicable standards and requirements. Non-compliant configuration elements are identified for remediation by an operator.

6.5 Disclosed Embodiments are Non-Limiting

It will also be recognized by those skilled in the art that, while the technology has been described above in terms of non-limiting embodiments, it is not limited thereto. Various features and aspects of the above-described technology may be used individually or jointly in any combination or sub-combination. In particular, any or all features of one embodiment may be used in combination with any or all features of another embodiment. Further, although the technology has been described in the context of its implementation in a particular environment, and for particular applications, those skilled in the art will recognize that its usefulness is not limited thereto and that the present technology can be beneficially utilized in any number of different environments and implementations where it is desirable to adapt or use the present non-limiting technology or features thereof. Accordingly, the claims set forth below should be construed in view of the full breadth and spirit of the technology as disclosed herein, and the invention shall be defined try the appended claims.

What is claimed:

1. Apparatus comprising:
a source computer system comprising at least one source computer system processor connected to source computer system storage and to a source computer system communication interface, the source computer system storage storing an application providing at least one computing function and associated data, the source computer system having at least one source computer system characteristic;
a target computer system comprising at least one target computer system processor connected to target computer system storage and to a target computer system communication interface, the target computer system having at least one target computer system characteristic;
at least one computer storage storing transition templates specifying one or more target computer system operational and testing requirements; and
a transition management computer system in communication with the source computer system and the target computer system via the source computer system communication interface and the target computer system communication interface, respectively, the transition management computer system comprising:
at least one transition management processor operating a transition management application, and
a transition management computer system communications interface operatively coupled to the at least one transition management processor, the source computer system communication interface and the target computer system communication interface, the transition management application being configured to use the transition management computer system communication interface to communicate with the source computer system communication interface and the target computer system communication interface,
the at least one transition management processor configured to perform operations comprising:
identifying at least one type of transition to perform based upon the at least one source computer system characteristic,
selecting one or more of the transition templates, based upon the identified at least one type of transition, the at least one source computer system characteristic, and the at least one target computer system characteristic, to provide compliance with at least one aspect of the specified one or more target computer system operational and testing requirements, the selected one or more of the transition templates further specifying at least one operational requirement for the at least one computing function,
converting the selected one or more of the transition templates to a sequence of ordered automated actions, and
executing the sequence of ordered automated actions to migrate provision and performance of the at least one computing function from the source computer system to the target computer system,
wherein the sequence of ordered automated actions includes automatically testing and verifying operation of the target computer system with the provision and performance of the at least one computing function migrated thereto against the specified at least one operational requirement for the at least one computing function.

2. A method of operating a transition manager computer system including at least one processor operating a transition manager program and a communications interface, wherein the transition manager program is in communication using the communication interface with a source computer system and a target computer system, the method comprising the at least one processor performing operations to transition or migrate a software configuration from the source computer system to the target computer system, comprising:
identifying and characterizing an aspect of the source computer system to be transitioned or migrated,
storing the identified and characterized aspect of the source computer system as a data structure in a data store,
characterizing an aspect of the target computer system and a current target deployment architecture thereof,
identifying at least one transition comprising a change in deployed configuration to be performed based upon the identified and characterized aspect of the source computer system and the characterized aspect of the target computer system,
obtaining transition/migration templates specifying a set of encoded, computer-readable target computer system operational and testing requirements,
selecting one or more of the transition/migration templates based upon a type of the identified at least one transition, the identified and characterized aspect of the source computer system, the characterized aspect of the target computer system, and the set of encoded, computer-readable target computer system operational and testing requirements,
associating the source computer system and the target computer system with the selected one or more transition/migration templates,
converting the selected one or more transition/migration templates to a transition/migration workstream comprising a sequence of ordered automated actions,
storing data representing the sequence of ordered automated actions in a data store,
executing the sequence of ordered automated actions to transition or migrate aspects of the source computer system to the target computer system, the transition or migration of the aspects including changing at least one aspect of the software configuration, and
after executing, verifying that the changed software configuration is operational on the target computer system.

3. The method of claim 2, wherein the identifying and characterizing the aspect of the source computer system includes discovering dependencies between software configuration components.

4. The method of claim 2, wherein the identifying and characterizing the aspect of the source computer system includes discovering dependencies of the software configuration including components thereof with components external to the source computer system.

5. The method of claim 2, wherein performing the operations further includes producing one or more transition/migration templates reflecting dependencies of source computer system software configuration components.

6. The method of claim 2, wherein the selecting one or more transition/migration templates includes selecting templates based upon dependencies.

7. The method of claim 2, wherein the converting includes ordering the sequence of ordered actions to encoded dependencies resolve.

8. The method of claim 7, wherein the executing the sequence of ordered automated actions includes rewriting/adjusting a configuration of the target computer system to reflect changes to a configuration of various dependent components so that the dependent components operate from migrated target system components.

9. A migration controller comprising:
at least one migration processor operating a transition manager program and operatively coupled to at least one computer storage, and
a migration communications interface configured to enable the transition manager program to receive information from a source computing device and a target computing device;
the at least one migration processor executing the transition manager program to perform migration operations comprising:
identifying a type of transition to perform based upon at least one source computing device characteristic,
selecting one or more transition/migration templates specifying a set of encoded, computer readable one or more target computing device operational and testing requirements, based upon the identified type of transition, at least one source computing device characteristic, and at least one target computing device characteristic,
converting the selected one or more transition/migration templates to an automated sequence of ordered actions, and
automatically performing the automated sequence of ordered actions to migrate provision and execution of at least one computing function from the source computing device to the target computing device, including automatically testing and verifying operation of the migrated provision and execution of the at least one computing function on the target computing device against the set of encoded, computer-readable one or more target computing device operational and testing requirements.

10. The migration controller of claim 9, further including discovering dependencies between components of the at least one computing function.

11. The migration controller of claim 9 further including discovering dependencies of the at least one computing function with components external to the source computing device.

12. The migration controller of claim 9, further including producing the one or more transition/migration templates reflecting dependencies of components of the at least one computing function.

13. The migration controller of claim 9, wherein the selecting one or more transition/migration templates includes selecting based upon dependencies.

14. The migration controller of claim 9, wherein the converting includes ordering of the automated sequence of ordered actions to resolve encoded dependencies.

15. The migration controller of claim 14, further including rewriting/adjusting at least one configuration of the target computing device to reflect changes to configuration of dependent components so the dependent components operate from migrated components.

* * * * *